(12) United States Patent
Andersen et al.

(10) Patent No.: US 11,639,261 B2
(45) Date of Patent: May 2, 2023

(54) SCREW CAP SYSTEM

(71) Applicant: KEEP-IT TECHNOLOGIES AS, Oslo (NO)

(72) Inventors: Peder Oscar Andersen, Oslo (NO); David Brown, Oslo (NO)

(73) Assignee: KEEP-IT TECHNOLOGIES AS, Oslo (NO)

(*) Notice: Subject to any disclaimer, the term of this patent is extended or adjusted under 35 U.S.C. 154(b) by 722 days.

(21) Appl. No.: 16/486,811

(22) PCT Filed: Feb. 16, 2018

(86) PCT No.: PCT/EP2018/053895
§ 371 (c)(1),
(2) Date: Aug. 16, 2019

(87) PCT Pub. No.: WO2018/149972
PCT Pub. Date: Aug. 23, 2018

(65) Prior Publication Data
US 2019/0359409 A1    Nov. 28, 2019

(30) Foreign Application Priority Data
Feb. 16, 2017  (NO) .................................. 20170237

(51) Int. Cl.
| B65D 79/00 | (2006.01) |
| B65D 79/02 | (2006.01) |
| B65D 41/04 | (2006.01) |
| G01N 31/22 | (2006.01) |
| G09F 3/00 | (2006.01) |

(52) U.S. Cl.
CPC ............ *B65D 79/02* (2013.01); *B65D 41/04* (2013.01); *G01N 31/229* (2013.01); *G09F 3/0294* (2013.01)

(58) Field of Classification Search
CPC ...... B65D 79/02; B65D 41/04; G01N 31/229; G09F 3/0294
USPC .......................................................... 374/102
See application file for complete search history.

(56) References Cited

U.S. PATENT DOCUMENTS

| 2,953,921 | A | 9/1960 | Muncheryan |
| 4,872,570 | A | 10/1989 | Harding |
| 5,667,303 | A | 9/1997 | Arens et al. |
| 5,839,592 | A | 11/1998 | Hayes |
| 6,373,786 | B1 | 4/2002 | Kagan et al. |

(Continued)

FOREIGN PATENT DOCUMENTS

| EP | 0469933 | 2/1992 |
| FR | 2836677 | 9/2003 |
| GB | 2283735 | 5/1995 |

(Continued)

OTHER PUBLICATIONS

Notice of Reasons for Rejection dated Jan. 17, 2022, directed to JP Application No. 2019-544027; 14 pages.

(Continued)

*Primary Examiner* — Daniel A Hess
(74) *Attorney, Agent, or Firm* — Morrison & Foerster LLP

(57) ABSTRACT

The present invention relates to time temperature indicator (TTI) systems for monitoring the time and temperature exposure of foods, nutraceuticals, pharmaceuticals, chemicals and similar products. More particularly, the present invention provides a cap system, such as a screw cap system, featuring a TTI system.

12 Claims, 23 Drawing Sheets

(56) References Cited

U.S. PATENT DOCUMENTS 9,235,194 B2     1/2016    Higgins
2014/0318437 A1   10/2014   Hong et al.

FOREIGN PATENT DOCUMENTS

| | | |
|---|---|---|
| GB | 2344101 | 5/2000 |
| GB | 2443185 | 4/2008 |
| GB | 2459317 | 10/2009 |
| JP | 3763578 B2 | 1/2006 |
| JP | 2015-231848 A | 12/2015 |
| KR | 10-2014-0020451 A | 2/2014 |
| WO | 92/00891 | 1/1992 |
| WO | 94/29186 | 12/1994 |
| WO | 02/02429 | 1/2002 |
| WO | 2009/040547 | 4/2009 |
| WO | 2012/141594 | 10/2012 |
| WO | 2015/112496 | 7/2015 |
| WO | 2017/103206 | 6/2017 |
| WO | 2018/149972 | 8/2018 |

OTHER PUBLICATIONS

International Search Report and Written Opinion dated May 28, 2018, directed to International Application No. PCT/EP2018/053895; 13 pages.
The 3rd Office Action dated Aug. 2, 2021, directed to CN Application No. 201880012204.3; 9 pages.

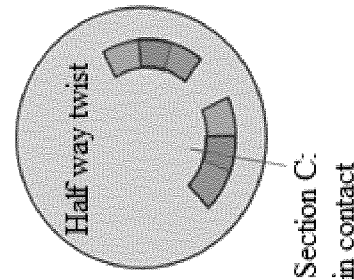
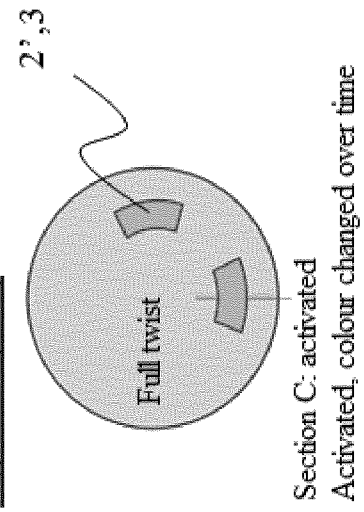
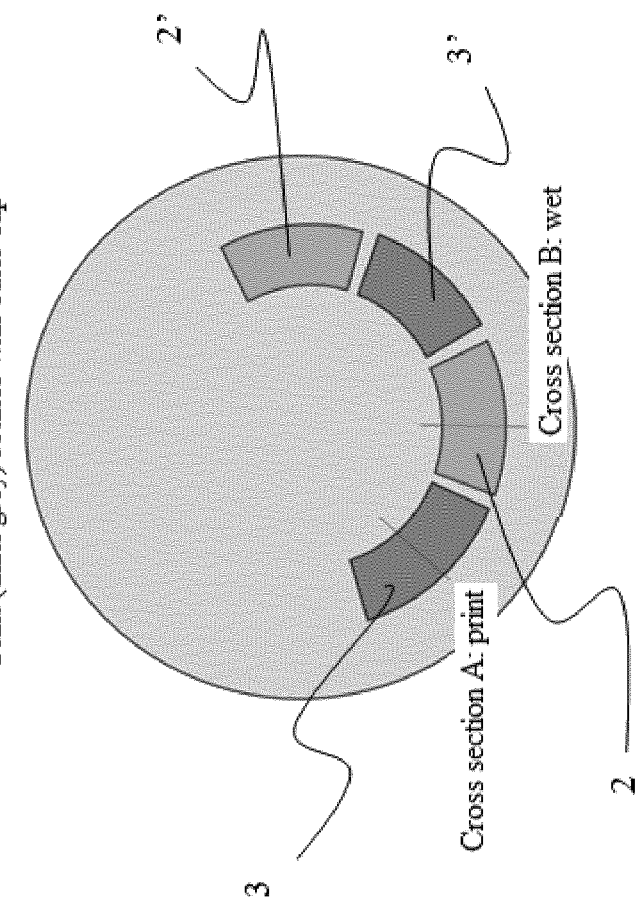

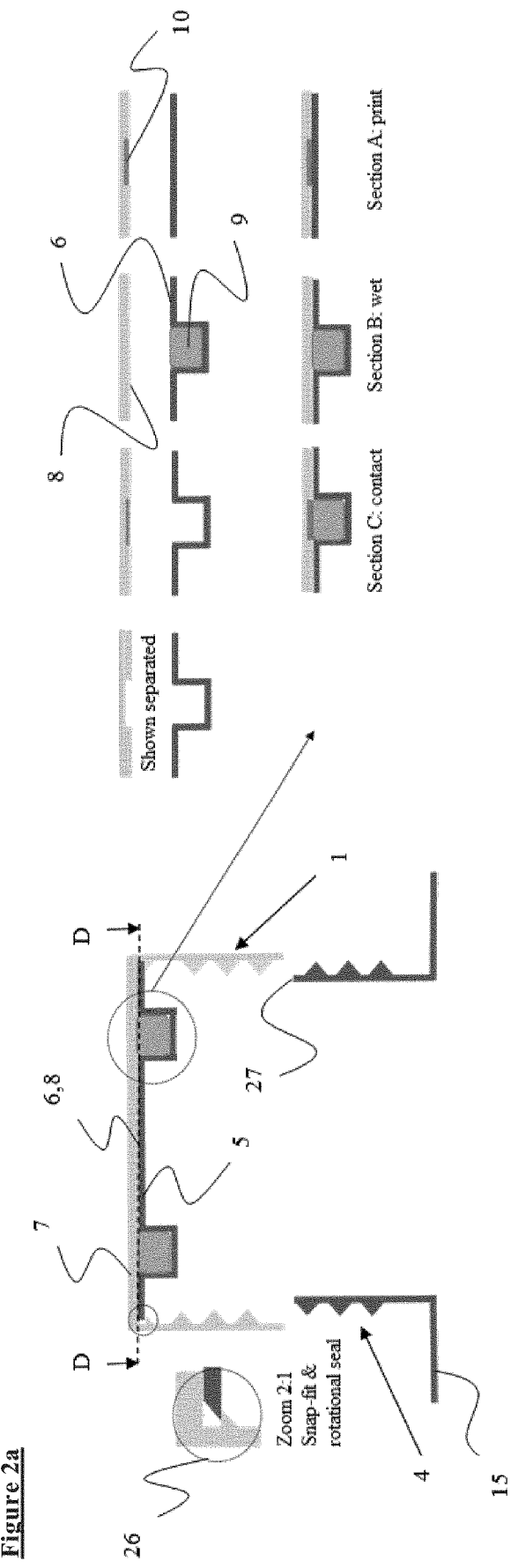

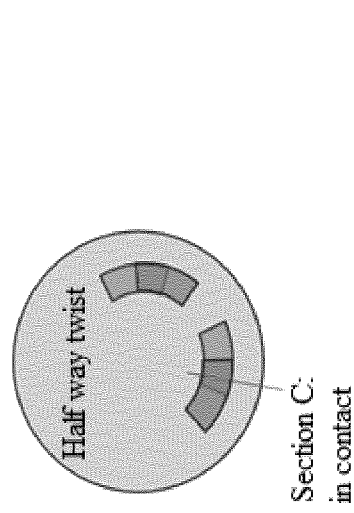
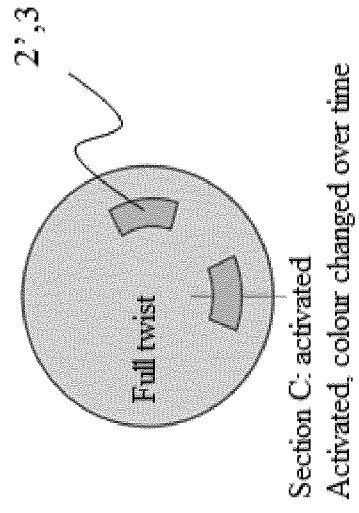
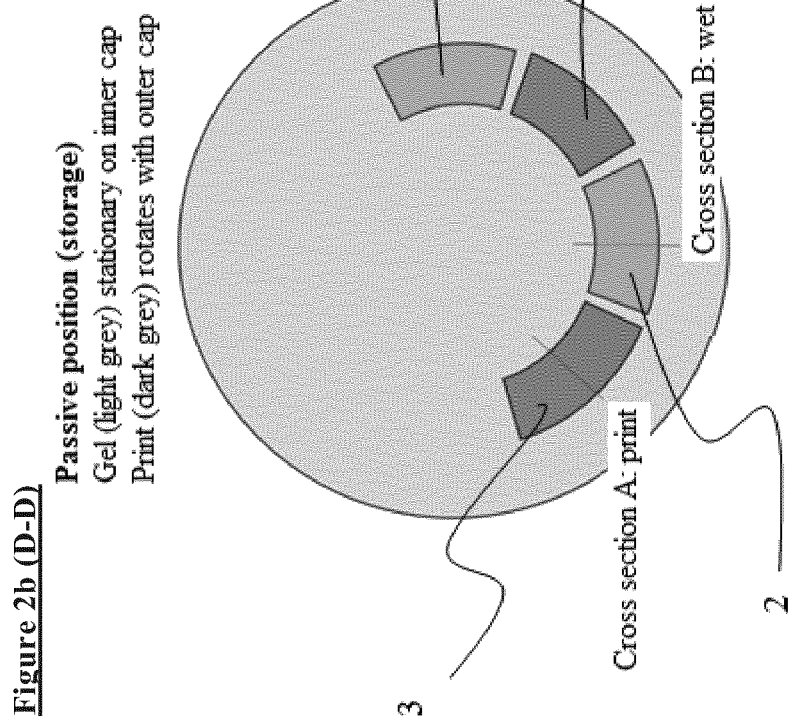

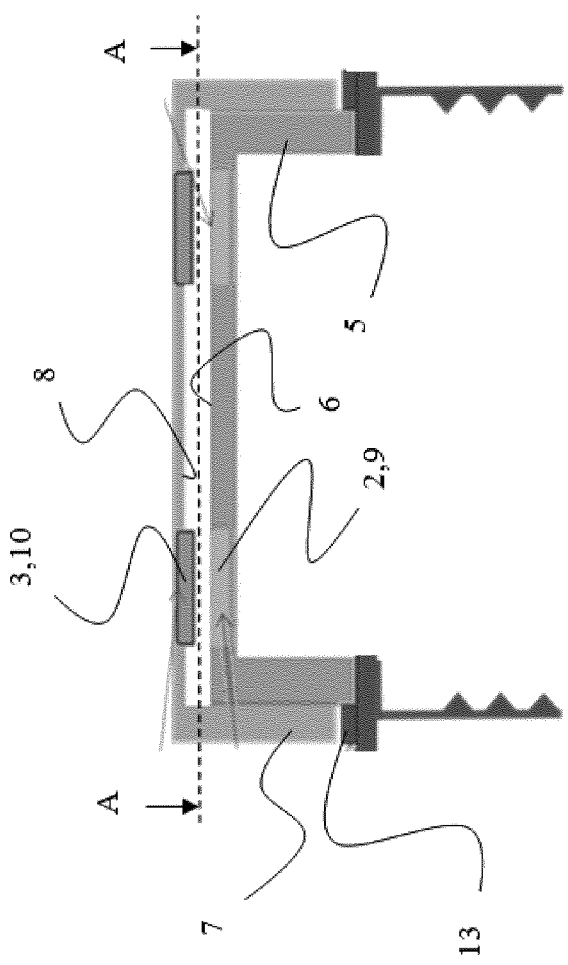
Figure 3a
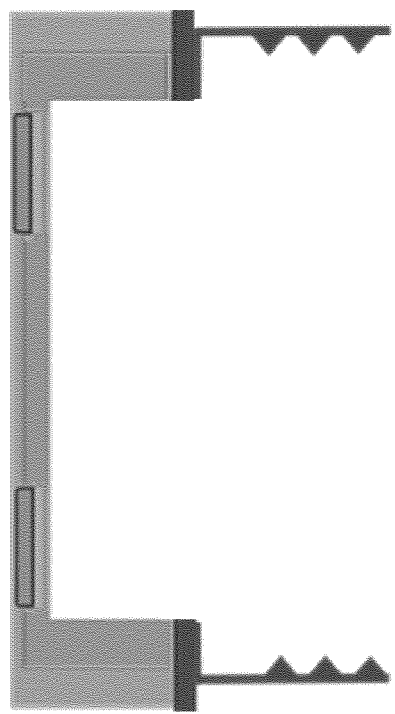
Figure 3b
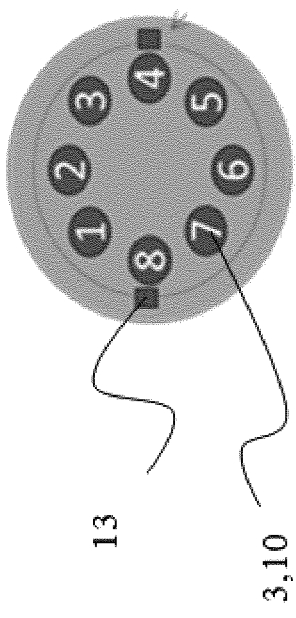
Figure 3c (A-A)
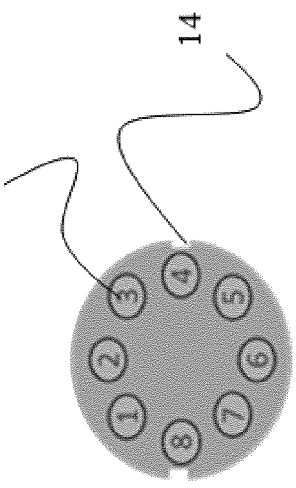
Figure 3d (top view)

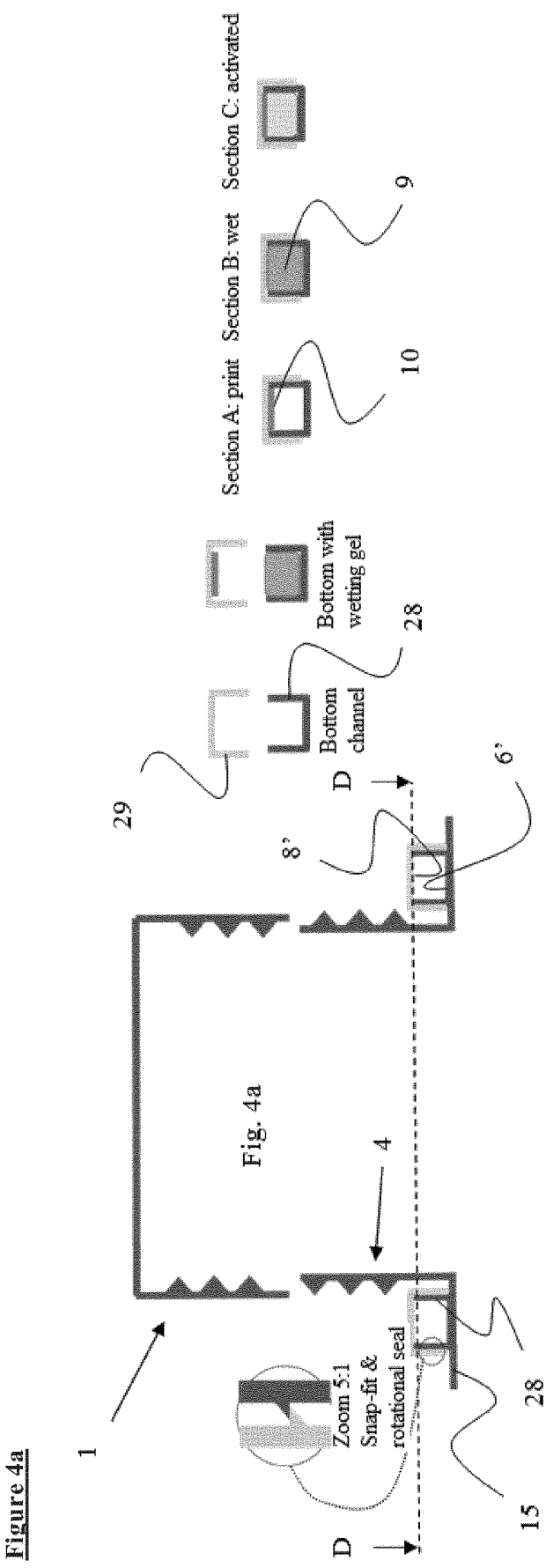

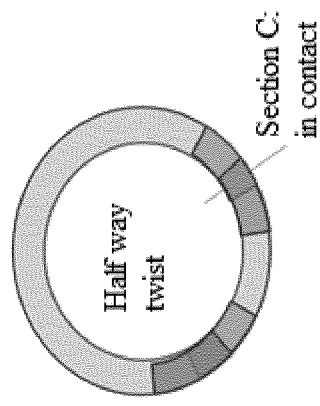
Figure 4c (D-D)
Half way twist
Section C: in contact
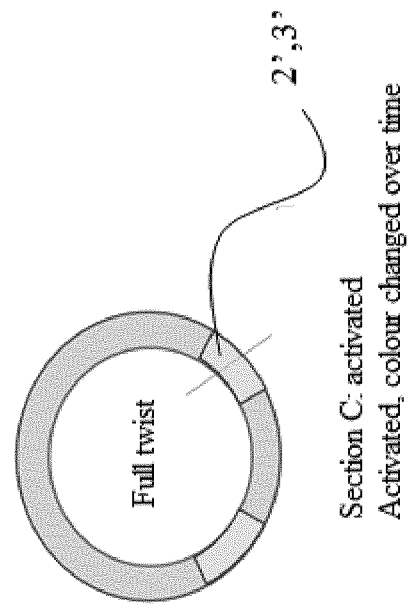
Figure 4d (D-D)
Full twist
2', 3'
Section C: activated
Activated, colour changed over time
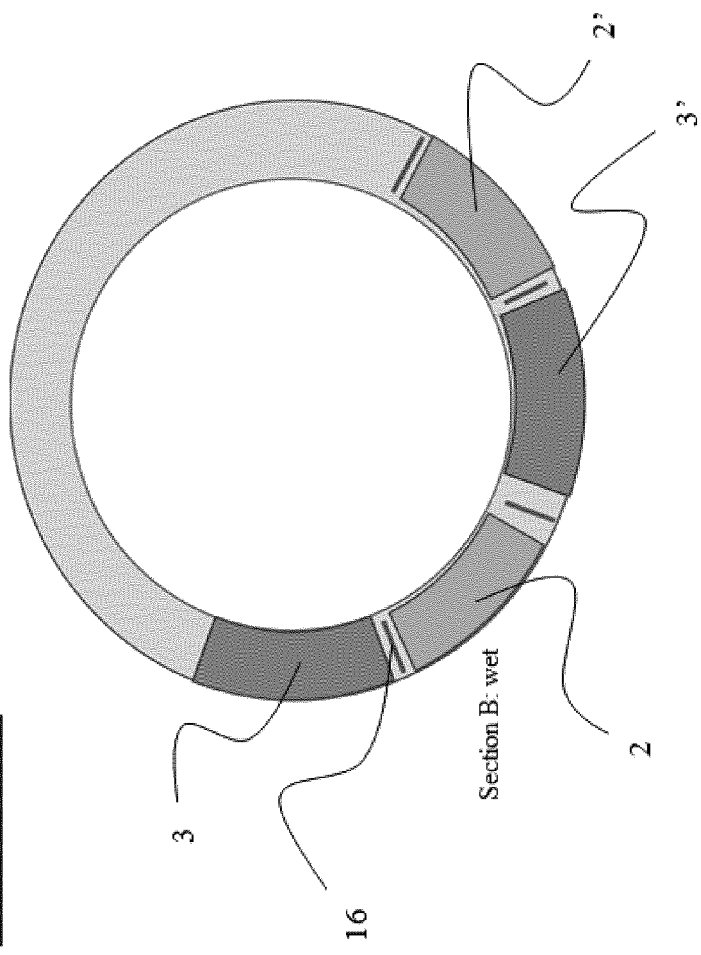
Figure 4b (D-D)
3
16
Section B: wet
2
2'
3'

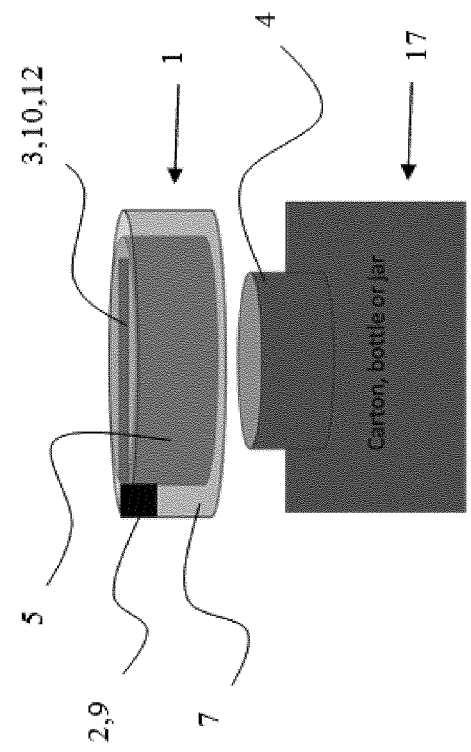
Figure 5a
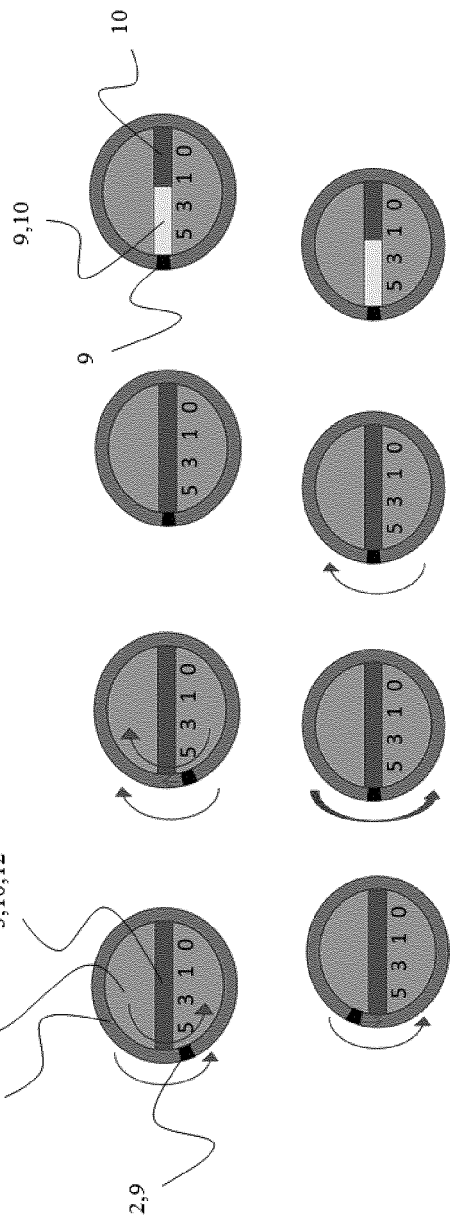
Figure 5b (top view)
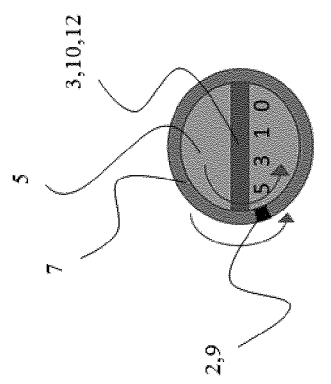
Figure 5c (top view)

Cap(top) topview
(unactivated)

Function (same as for setup 1 or 2; setup 2 shown)

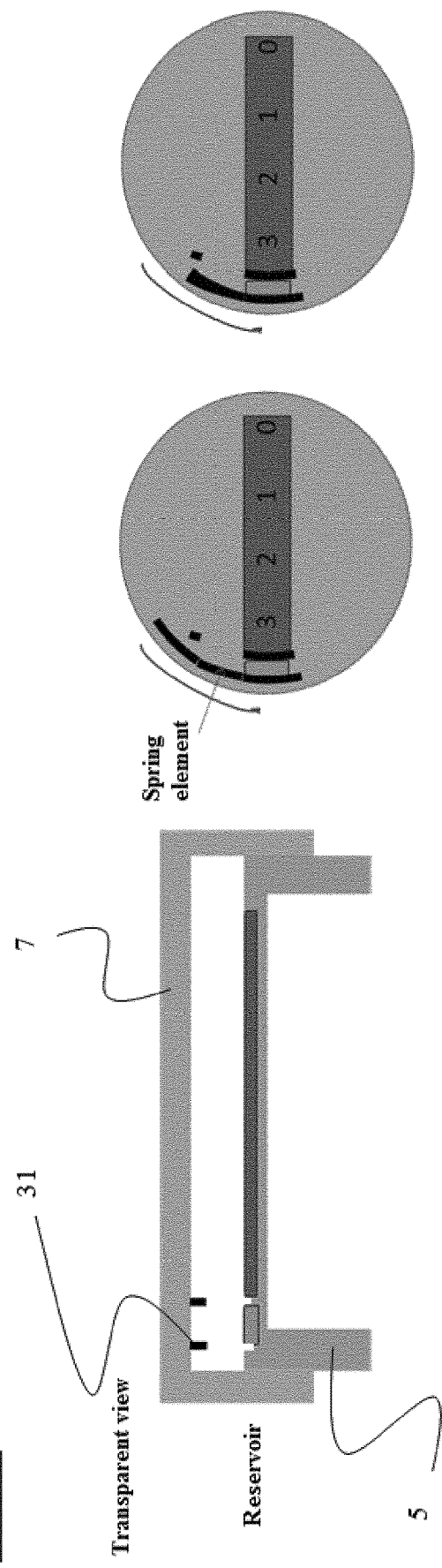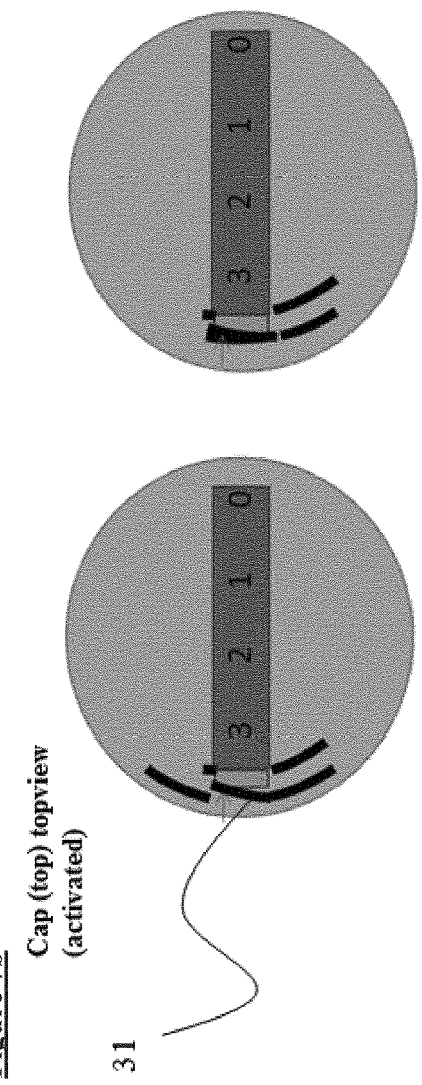

Cap (top) topview, alternative (unactivated)

Cap (top) topview, unactivated

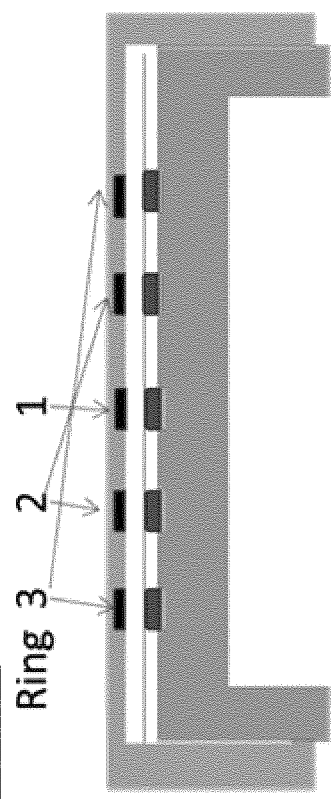
Figure 9a
Figure 9b

Arm gets pulled around by cap for ¼ turn, then disengages. Either by burst tags (similar to anti-tamper ring) or by ratchet teeth that disengage with height increase due to thread pitch (similar to Helicap). One-way action.

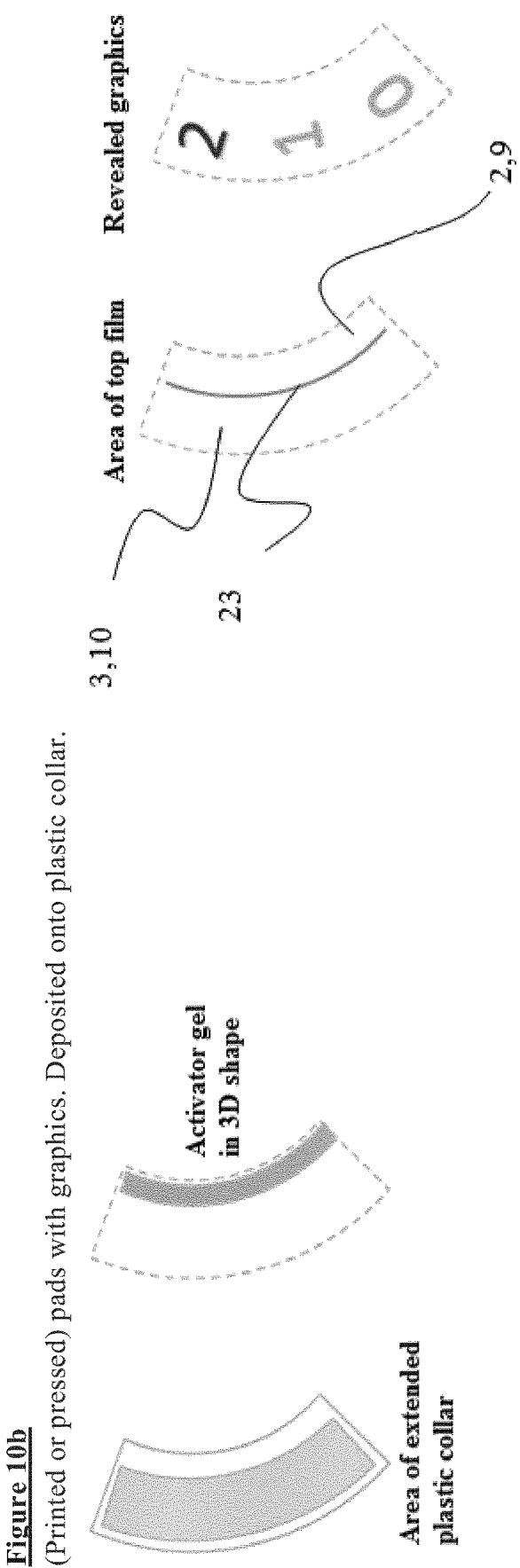

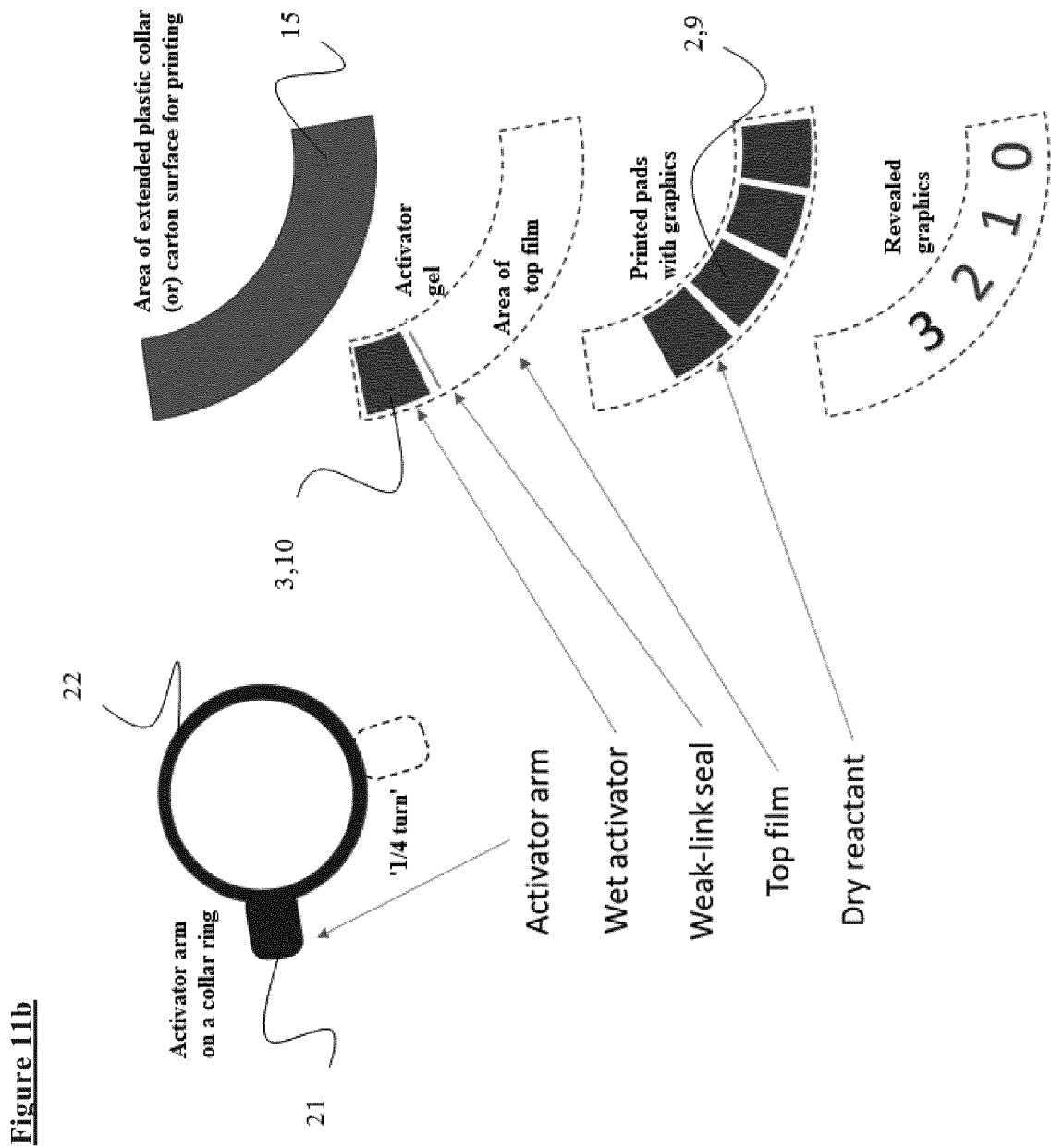

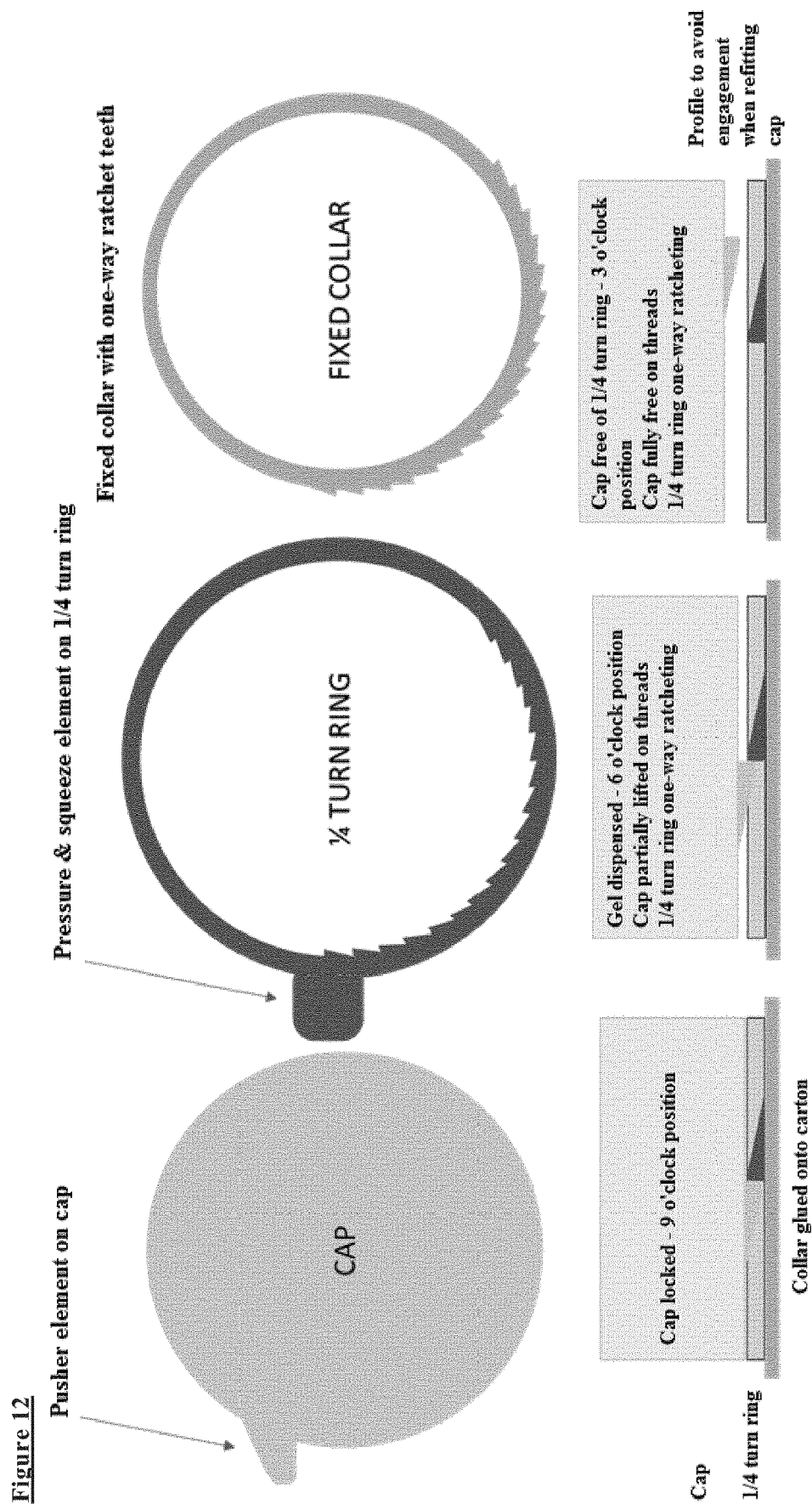

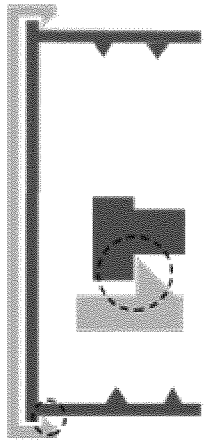

Snap-fit at top
Full or partial ring (on outer)
Causes surface to surface pressure fit on underside of outer vs topside of inner

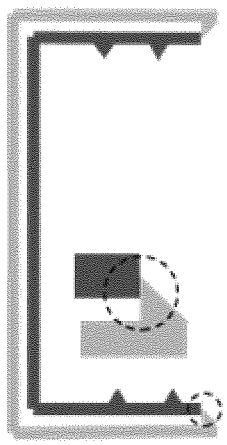

Snap-fit at base
Full or partial ring (on outer)
Causes surface to surface pressure fit on underside of outer vs topside of inner

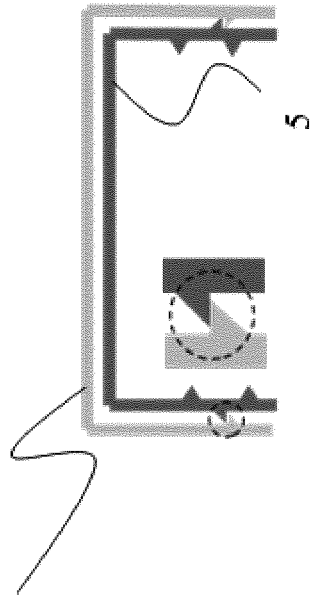

Snap-fit on side
Full or partial rings
Causes surface to surface pressure fit on underside of outer vs topside of inner

Figure 14

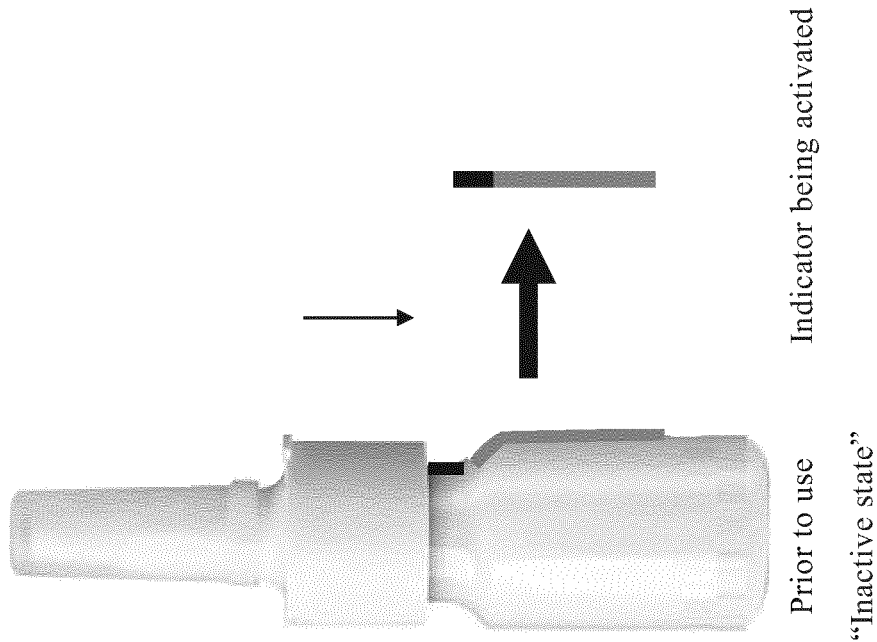
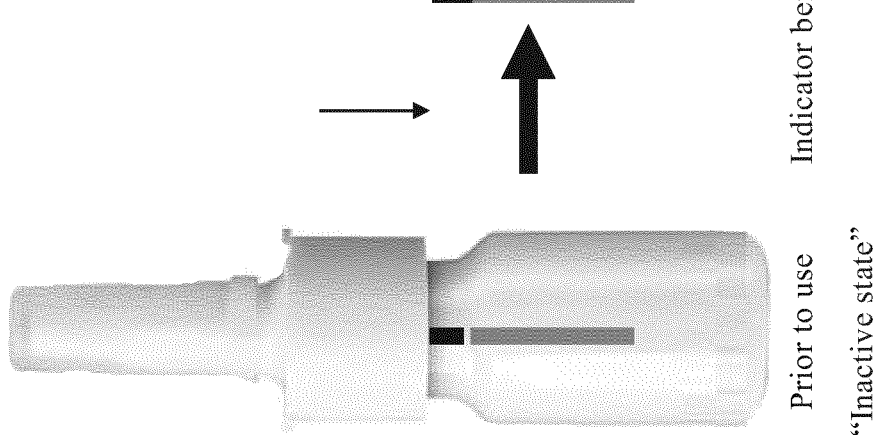
Figure 17
A) Front view
B) Side view

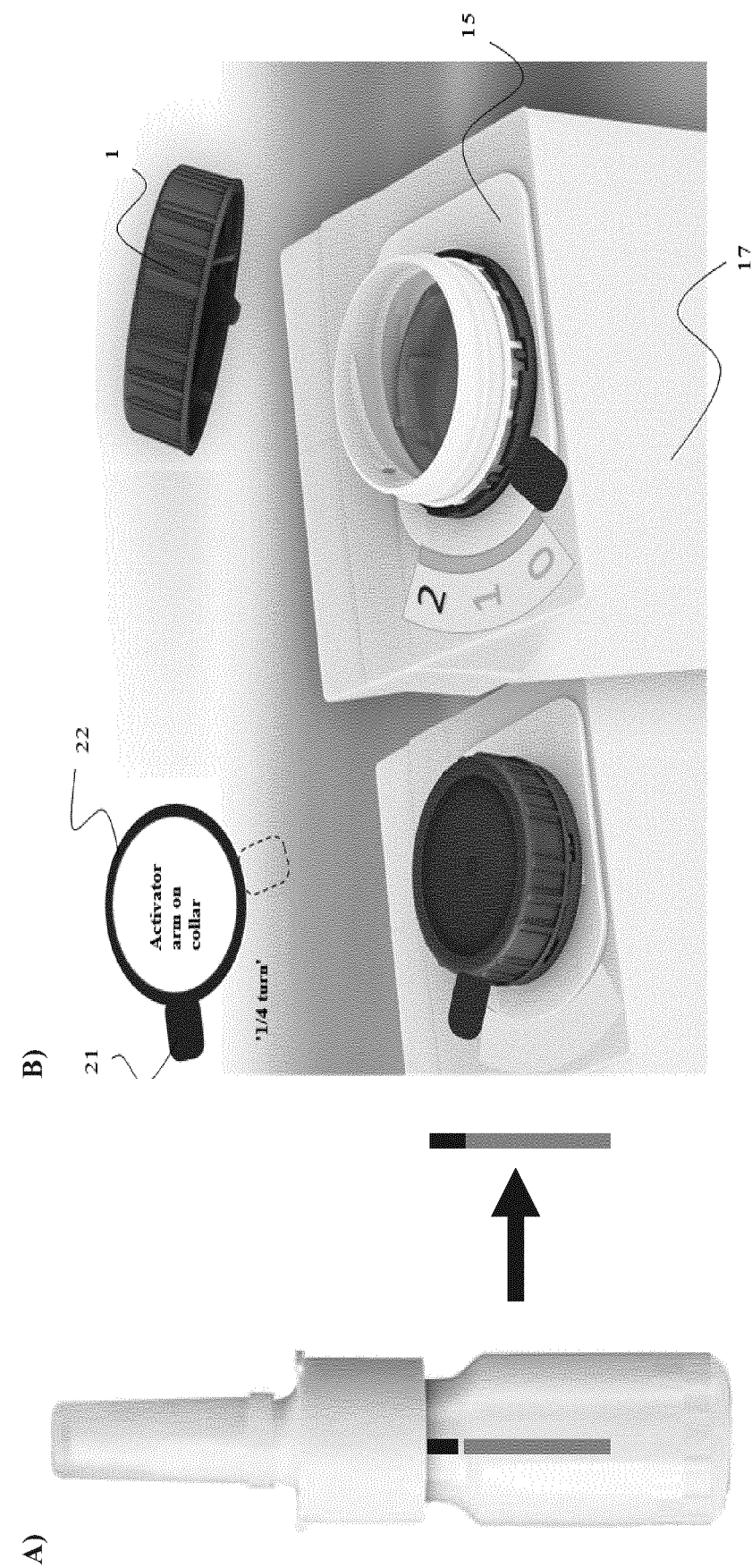

SCREW CAP SYSTEM

CROSS REFERENCE TO RELATED APPLICATIONS

This application is a U.S. National Phase patent application of PCT/EP2018/053895, filed Feb. 16, 2018, which claims priority to Norwegian Patent Application No. 20170237, filed Feb. 16, 2017, the entire contents of each of which are incorporated herein by reference.

FIELD OF THE INVENTION

The present invention relates to time temperature indicator (TTI) systems for monitoring the time and temperature exposure of foods, nutraceuticals, pharmaceuticals, chemicals and similar products. More particularly, the present invention provides a cap system, such as a screw cap system, featuring a TTI system.

BACKGROUND OF THE INVENTION

Many products, particularly in the food and pharmaceutical industries, degrade, decay or perish over a finite lifetime. The rate at which such products degrade may depend on the environmental conditions. Accordingly, such products are often inserted into a container under controlled environmental conditions and the container is sealed to isolate the products from an environment external to the container and thereby keep the products fresher for longer periods of time. On opening such a container for the first time, the products contained within are exposed to the external environment and degradation of the products typically accelerates relative to a rate of degradation of the products when in the sealed container. Further, the rate of degradation commonly depends on the surrounding temperature. Accordingly, it is conventional to specify both a shelf life for products contained in a sealed container prior to opening the container and a period within which the products should be used after first opening the container.

A problem with storing products in containers in this way is that, without recording the time of first opening a specific container, it is difficult to determine to what extent the products contained within the container have degraded and, in particular, whether the period within which the products should have been used after first opening the container has expired. In the case of food or pharmaceutical products, consumption of such products after expiry of the period within which the products should have been used after first opening the container may represent a health risk.

Various solutions to this problem exist. For instance, U.S. Pat. Nos. 9,235,194 and 6,373,786 disclose time indicators activated by opening a sealed container.

WO2009/040547 discloses a time indicator device comprising first and second interconnected reservoirs containing first and second liquids respectively. A first barrier is provided between said first and second liquids to prevent said liquids mixing. Said first barrier is connected via a conduit to a third reservoir containing a third liquid which is adapted to pass along said conduit over a first predetermined time period and to effect removal of said first barrier upon contact to facilitate mixing of said first and second liquids and generation of a liquid mixture within the second reservoir of different color to the second liquid prior to mixing and thereby provide an indication of when said first predetermined time period has elapsed.

U.S. Pat. No. 4,872,570 discloses tamper indicators, and more particularly, tamper indicators which function in response to relative movement between two separate elements of the indicator.

SUMMARY OF THE INVENTION

The goal of the present invention is to provide an improved cap system, such as a screw cap system, for a container. The cap system features a threshold indicator or a time indicator, preferably a time temperature indicator, activated in the process of opening a container for the first time.

The present invention is defined in the attached claims, and in the following:

In some embodiments, the present invention provides a cap system comprising a cap (1) for closure of an opening (4) in a container (17) and a time temperature indicator system, wherein the time temperature indicator system comprises at least one first section (2) comprising a first composition (9) and at least one second section (3) comprising a second composition (10); the first composition and the second composition providing a time and temperature dependent visual change in appearance when brought into contact with each other; the first and second composition initially being separated; and the time temperature indicator (TTI) system is activated by moving the cap (1), wherein the first and the second composition comes into contact with each other during said movement.

In some embodiments, the at least one first section is moved relative to the at least one second section when the cap is moved to activate the TTI.

In some embodiments, the first and the second composition comes into contact with each other during said movement by means different from free flow. One example of free flow is a liquid containing capsule that is ruptured during activation followed by free flow of liquid out of the capsule where it comes in contact with the other composition.

In some embodiments, the first composition is moved relative to the second composition when the cap is moved to activate the TTI. In some embodiments, the first composition is moved relative to the second composition when the cap is moved to activate the TTI while the at least one first section and/or the at least one second section is not being moved when the cap is moved to activate the TTI.

In some embodiments according to the present invention, the cap (1) is a screw cap. In one embodiment according to the present invention, the opening (4) is a threaded opening. In one embodiment according to the present invention, the cap (1) is a screw cap and the opening (4) is a threaded opening. The screw cap preferably comprises a closed top, an open end and an internal threading for interaction with a threaded opening in a container.

In some embodiments according to the present invention, the first section is not located adjacent to the second section. In another embodiment, the first section is initially physically separated, e.g. by a predetermined physical distance, from the second section to ensure that the first composition and the second composition are not brought into contact with each other prior to activation.

In some embodiments according to the present invention, the first composition and the second composition are initially being separated, but they are not separated by means of a sealing. Since the first composition and the second composition are initially not being separated by a sealing, the time temperature indicator system is not activated by opening and/or breaking a sealing.

In some embodiments of the cap system, the at least one first section or the at least one second section may be moved between a first position and a second position, in the first position the first and the second compositions are separate and in the second position the first and the second composition are in contact.

In some embodiments of the cap system, the at least one first section is arranged at a first surface and the at least one second section is arranged at a second surface facing the first surface.

In some embodiments, the first and the second surfaces are in contact during activation of the TTI system. After the TTI system has been activated, the TTI system will remain active even if the first and the second surfaces are not in direct contact after activation. Before activation, the first and the second surface may be separate or in contact depending on the mode of activation.

In some embodiments, the first and the second surfaces are in contact after the TTI system is activated. Before activation, the first and the second surface may be separate or in contact depending on the mode of activation.

In some embodiments of the cap system, the first and the second surface are arranged to rotate relative to each other between the first and the second position when the cap is twisted.

In some embodiments of the cap system the cap comprises an inner cap element and an outer cap element, and the inner cap element is moved relative to the outer cap element when the time temperature indicator (TTI) system is activated by moving the cap.

In some embodiments of the cap system, the first and the second surfaces are arranged to move relative to each other between the first and the second position when the outer cap element is pushed towards the inner cap element.

In some embodiments of the cap system, the first and the second surface are arranged to move relative to each other between the first and the second position when the inner cap element is pulled towards the outer cap element.

In some embodiments of the cap system the inner cap element comprises the first surface and the outer cap element comprises the second surface.

In some embodiments of the cap system, the cap (1) is a screw cap and the opening (4) is a threaded opening. The first and the second surface are preferably arranged to rotate relative to each other between the first and the second position when the outer cap element is twisted.

In some embodiments according to the present invention, the cap (1) is a screw cap, the screw cap preferably comprising a threaded opening featuring a collar arrangeable on a container.

In some embodiments of the screw cap system, the collar comprises the first surface, or the first surface is on a container on which the collar may be arranged, and the second surface is arranged on a ring element releasably connected to the screw cap, such that the second surface is rotated relative the first surface and the ring element released from the screw cap when the screw cap is twisted during opening.

In some embodiments of the cap system, at least one of the first section and the second section comprises a transparent material, such that the visual change in appearance is visible on an external surface of the screw cap system, preferably the second surface is part of a transparent section.

In some embodiments of the cap system, the first section comprises a recess/pocket in the first surface and the second section comprises a recess/pocket in the second surface.

In some embodiments, the cap system comprises a seal-breaking element arranged to break a sealing between the at least one first section and the at least one second section when the first section and the second section are moved between the first position and the second position.

In some embodiments, the screw cap system comprises a seal-breaking element arranged to break a sealing between the at least one first section and the at least one second section, wherein the seal-breaking element is an arm/tab arranged on a releasable ring, the ring connected to a lower edge of the screw cap, such that the ring is released from the lower edge when the screw cap and the releasable ring are twisted beyond a desired range.

In some embodiments of the screw cap system, the at least one first section and the at least one second section is arranged on a collar comprising a threaded opening, or on the surface of a container on which the screw cap system is arranged, the at least one first section and the at least one second section arranged such that the sealing is broken when the arm/tab is moved over at least parts of the first or second section when the screw cap is twisted.

In some embodiments of the screw cap system, the collar comprises a lower channel element comprising the at least one first section and a cooperating upper channel element comprising the at least one second section, at least parts of the upper channel element is transparent and may rotate relative the lower channel element.

In some embodiments of the screw cap system, the upper channel element is releasably connected to the screw cap, such that the upper channel element is rotated relative the lower channel element and released from the screw cap when the screw cap is twisted during opening.

In some embodiments of the screw cap system, the collar is arrangeable at a container opening.

In some embodiments of the cap system, the first composition is a liquid or gel composition, and the second composition is a dry composition.

In some embodiments according to the present invention, the first composition is a dry composition and the second composition is a dry composition.

In some embodiments of the cap system the first composition is a liquid composition and the second composition is distributed in a longitudinal element made in a material through which the liquid composition may migrate in a time temperature dependent manner, and wherein the first composition and one end of the longitudinal element comes into contact with each other when the time temperature indicator (TTI) system is activated by moving the cap.

In some embodiments according to the present invention, neither the first composition nor the second composition comprises any metal compounds in solid phase prior to activation. In some embodiments according to the present invention, the compositions providing a time and temperature dependent visual change in appearance when brought into contact with each other do not contain any metal compounds in solid phase prior to activation. Preferably, the time temperature indicator system does not comprise any metal compounds in solid phase prior to activation.

In some embodiments according to the present invention, the term "metal compound in solid phase" refers to a solid phase containing only one element, said element being metallic. Ag(s) being a typical example of a metal compound in solid phase composed of only one element, said element being metallic. AgCl(s) is a compound containing two different elements of which only one of the elements is metallic. Thus, in some embodiments AgCl(s) is not to be considered as a metal compound in solid phase. Ag+(1) is composed of only one element, said element being metallic, but it is not a solid phase. Thus, in some embodiments Ag+(1) is not to be considered as a metal compound in solid phase.

In some embodiments according to the present invention, the term "metal compound in solid phase" refers to a solid phase containing two or more elements, said elements being metallic. Bronze is an alloy consisting primarily of copper and a small amount of tin and often with the addition of other metals. Thus, in some embodiments bronze is to be considered a metal compound in solid phase.

In some embodiments according to the present invention, the term "metal compound in solid phase" refers to a solid phase containing two or more elements, at least one of the elements being metallic. Thus, in some embodiments an alloy consisting of copper, tin and at least one non-metal is to be considered a metal compound in solid phase.

In some embodiments according to the present invention, the cap system further comprises a permeable membrane. In some embodiments the permeable membrane is a gas permeable membrane and in particular a water vapour permeable membrane. In some embodiments the permeable membrane is a water permeable membrane. Preferably, the second section is arranged closer to the opening (4) than the first section; and the permeable membrane being arranged between the opening (4) and the second section.

In some embodiments according to the present invention, the first composition is dry (B1) and the second composition is moistened (B3), the moisture preferably originating from the environment within the container.

In some embodiments according to the present invention, the cap system further comprises an impermeable sealing (E3). In some embodiments the impermeable sealing is a gas impermeable sealing and in particular a water vapour impermeable sealing. In some embodiments the impermeable sealing is a water impermeable sealing. Preferably, the second section is arranged closer to the opening (4) than the first section; and the impermeable sealing being arranged between the opening (4) and the second section.

In some embodiments according to the present invention, the first composition is dry and the second composition is dry.

In some embodiments according to the present invention, the second section is arranged closer to the opening than the first section; and the impermeable sealing being arranged between the opening and the second section.

In some embodiments according to the present invention, the first composition is dry and the second composition is dry.

In some embodiments according to the present invention, the time temperature indicator (TTI) system is activated by moving the cap, wherein the first and the second compositions come into contact with each other during said movement; and an impermeable sealing is broken during said movement.

In some embodiments according to the present invention, moisture originating from the environment within the container passes an impermeable sealing which is broken and comes into contact with the first and second composition.

In some embodiments according to the present invention the first and/or second composition is exposed to components originating from within the container or from the environment outside the container when the time temperature indicator (TTI) system is activated.

In some embodiments according to the present invention, the first and second compositions initially are being separated by a sealing; the cap system further comprises a seal-breaking element; the time temperature indicator (TTI) system being activated by moving the cap; the seal-breaking element being arranged to break the sealing during said movement; and the first composition and/or second compositions are liquids.

In some embodiments according to the present invention, the cap system of claim 1 is not a cap system according to claim 1 wherein the first and second compositions initially are being separated by a sealing; the cap system further comprises a seal-breaking element; the time temperature indicator (TTI) system being activated by moving the cap; the seal-breaking element being arranged to break the sealing during said movement; and the first composition and/or second compositions are liquids.

In some embodiments according to the present invention, the first and second compositions initially are being separated by a sealing; the cap system further comprises a seal-breaking element; the time temperature indicator (TTI) system being activated by moving the cap; the seal-breaking element being arranged to break the sealing during said movement; the first composition and/or second compositions are liquids; and the cap system further comprises a composition-moving element arranged to bring the first composition in contact with the second composition during said movement; or the seal-breaking element being arranged to break the sealing and bring the first composition in contact with the second composition during said movement.

In some embodiments according to the present invention, the first composition and/or the second composition is not a liquid, a fluid or a gas. In some embodiments, the first composition and/or the second composition is not a liquid. In some embodiments, the first composition and/or the second composition is not a fluid. In some embodiments, the first composition and/or the second composition is not a gas.

In some embodiments according to the present invention, the first composition and/or the second composition is a gel or is being embedded in a gel.

In some embodiments according to the present invention, the first and second compositions initially are being separated by a sealing; and breaking the sealing is not sufficient to bring the first and second compositions in contact with each other.

In some embodiments according to the present invention, the first composition and/or the second composition has sufficiently high viscosity to ensure that breaking the sealing is not sufficient to bring the first and second compositions in contact with each other.

In some embodiments according to the present invention, the cap system further comprises a composition-moving element arranged to bring the first composition in contact with the second composition during said movement.

In some embodiments according to the present invention, the first and second compositions initially are being separated by a sealing; and the cap system further comprises a composition-moving element arranged to bring the first composition in contact with the second composition during said movement; or the cap system further comprises a seal-breaking element being arranged to break the sealing and bring the first composition in contact with the second composition during said movement.

In some embodiments according to the present invention, the first and the second composition come into contact with each other during said movement by controlled movement of at least one of the compositions towards the other.

In the context of the present invention, the term "controlled movement of a composition" refers to a movement produced by a physical force that is exerted on the composition and which results in a controlled rate of movement and controlled amount of composition that is moved. The physical force may e.g. be in the form of a composition-moving element arranged to bring the first composition in contact with the second composition during movement of the cap. The force exerted on the cap during movement of the cap may e.g. be transferred to the composition-moving element which will actively push at least one of the compositions towards the other. A liquid containing capsule that is punctured may provide a flow of liquid out of the capsule, but this kind of free flow is non-controlled movement and does not represent a controlled movement.

In some embodiments according to the present invention the TTI system does not comprise a fluid-containing capsule. In some embodiments according to the present invention a fluid-containing capsule is not ruptured during movement of the cap, i.e. during activation of the cap system.

In some embodiments according to the present invention, the cap system further comprises a composition-moving element arranged to move at least one of the compositions towards the other during movement of the cap.

In some embodiments according to the present invention, the first and second compositions initially are being separated by a sealing; and the cap system further comprises a seal breaking element; the seal breaking element being arranged to break the sealing and move at least one of the compositions towards the other at a controlled rate and/or controlled amount of composition during movement of the cap.

In some embodiments according to the present invention the first composition has volume X and the second composition has volume Y; and at least 80%, such as 85%, 90%, 95%, 98% or 100%, of the volume of at least one of the compositions is moved towards the other during movement of the cap, i.e. during activation of the cap system.

In some embodiments according to the present invention the first composition and/or second composition is non-flowing. In some embodiments according to the present invention the first composition is non-flowing. In some embodiments the second composition is non-flowing.

In the context of the present invention, the term "non-flowing" refers to phase that is either solid, semi-solid or a combination thereof. If a composition is non-flowing the composition will not move unless there is an external force that is exerted on the composition. Examples of non-flowing compositions are given in the following: a dry composition, a composition in the form of a gel or being embedded within a gel, a solid composition, a highly viscous composition without significant flow properties, a porous composition and a structured or crystalline composition. In view of the above it is clear that a liquid or a fluid is not a non-flowing composition. In the case of a liquid containing capsule, the liquid per se is not a non-flowing composition since flowability is an inherent property of the liquid.

A viscoelastic material is another example of a composition which may be considered a non-flowing composition, at least non-flowing within a certain time period. Non-flowing with regard to a viscoelastic material is depending on the observation time. A viscoelastic material is typically regarded as a non-flowing if the time is short and the elastic properties are significant. A viscoelastic material is also dependent on the shear forces applied to the material. A dilatant material is a material in which the viscosity increases with the rate of shear strain and may be non-flowing upon shear.

In some embodiments of the present invention the non-flowing material is a dilatant material, such as oobleck.

In some embodiments of the present invention the observation time is in the range of the time of activation process. In the range may be defined 10-500%, 20%-200% or 50%-200% -of time of the activation process.

In some embodiments according to the present invention, the first and the second composition comes into contact with each other during movement of the cap by means different from free flow. In some embodiments, the cap system further comprises means for bringing at least one of the compositions in contact with the other. A composition moving element being one example of a means for bringing at least one of the compositions in contact with the other.

A composition moving element may be in the form of a rigid element such as a rod, tube or spike that optionally comprises the first or the second composition. The composition moving element is typically pushed or pulled into contact with the other composition during movement of the cap, i.e. during activation of the cap system.

In some embodiments according to the present invention, the movement provided by the means for bringing at least one of the compositions in contact with the other is higher than the potential flow provided by the inherent properties of the composition. Thus, even though the first and/or second composition is a liquid they will not be brought in contact with each other by free flow but rather by controlled movement provided by the means for bringing at least one of the compositions in contact with the other.

In some embodiments according to the present invention, the movement provided by the means for bringing at least one of the compositions in contact with the other is a controlled movement of the at least one of the compositions from a at least first position to a at least second position wherein the at least one composition in the at least second position is in contact with the other composition.

In some embodiments according to the present invention, the movement provided by the means for bringing at least one of the compositions in contact with the other is the only movement provided for bringing at least one of the compositions in contact with the other.

In some embodiments according to the present invention, the movement provided by the means for bringing at least one of the compositions in contact with the other is only provided by a composition-moving element arranged to move at least one of the compositions in contact with the other least one of the In some embodiments according to the present invention the means for bringing at least one of the compositions in contact with the other is not provided by capillary forces.

In some embodiments according to the present invention the means for bringing at least one of the compositions in contact with the other is not provided by pressure differences.

In some embodiments according to the present invention the means for bringing at least one of the compositions in contact with the other is not provided by temperature differences.

In some embodiments according to the present invention the means for bringing at least one of the compositions in contact with the other is not provided by gravitational forces.

In the context of the present invention, the term "free flow" is defined as partially or fully displacement of composition without direct influence of a composition moving element in the activation process.

In some embodiments according to the present invention the first and the second composition come into contact with each other during said movement by controlled displacement of at least one of the compositions towards the other. Free flow does not represent controlled displacement.

In some embodiments according to the present invention, the cap system is for continuously monitoring time-temperature exposure of a product after the container housing the product has been opened for the first time after packaging.

In some embodiments according to the present invention, activation of the TTI system initiates a time-temperature dependent process. The time-temperature dependent process preferably being a process resulting in a visual change continuously reflecting the time-temperature exposure of the product after activation.

In some embodiments according to the present invention, the TTI system is not a tamper indicator.

In some embodiments, the present invention provides a cap system comprising a cap for closure of an opening in a container and a time temperature indicator system, wherein the time temperature indicator system comprises at least one first section having a coloured composition and at least one second section comprising a longitudinal element made in a material through which the coloured composition may migrate in a time-dependent manner; the first and second sections initially being separated; and the time temperature indicator (TTI) system is activated by moving the cap, such that the colored composition and one end of the longitudinal element comes into contact with each other.

In some embodiments of the second aspect, the coloured composition is a coloured liquid composition.

In some embodiments of the second aspect, the longitudinal element is made in a material through which the coloured composition may migrate in a time-temperature dependent manner.

In some embodiments of the second aspect, the at least one first section is moved relative to the at least one second section when the cap is moved to activate the TTI.

In some embodiments according to the second aspect of the present invention, the cap (1) is a screw cap. In some embodiments of the present invention, the opening (4) is a threaded opening. In some embodiments of the present invention, the cap (1) is a screw cap and the opening (4) is a threaded opening. The screw cap preferably comprising a closed top, an open end and an internal threading for interaction with a threaded opening in a container.

In some embodiments of the present invention, the at least one first section or the at least one second section may be moved between a first position and a second position, in the first position the first and the second compositions are separate and in the second position the first and the second compositions are in contact.

In some embodiments of the present invention, the cap system further comprises a composition-moving element arranged to bring the first composition in contact with the second composition during movement of the cap.

In some embodiments of the present invention, the colored composition is not a liquid, a fluid or a gas.

In some embodiments of the present invention, the colored composition is a gel or being embedded in a gel.

In some embodiments of the present invention, the colored composition and/or the longitudinal element initially are being separated by a sealing. The cap system further comprising a seal-breaking element being arranged to break the sealing during movement of the cap.

In some embodiments of the present invention, the colored composition and/or the longitudinal element initially are being separated by a sealing; and breaking the sealing is not sufficient to bring the first composition in contact with the longitudinal element. The cap system then preferably further comprising a seal-breaking element being arranged to break the sealing and bring the colored composition in contact with the longitudinal element during movement of the cap.

In some embodiments of the present invention, the cap system further comprises a composition-moving element arranged to bring the colored composition in contact with the longitudinal element during movement of the cap.

In some embodiments of the present invention, the colored composition comes into contact with the longitudinal element during movement of the cap by a controlled movement of either the colored composition or the longitudinal element towards the other.

In some embodiments of the present invention, free flow of the colored composition is not controlled movement.

In some embodiments of the present invention, the colored composition has volume X; and at least 80%, such as 85%, 90%, 95%, 98% or 100%, by volume of the colored composition is moved towards the longitudinal element during movement of the cap.

In some embodiments the present invention, the colored composition is non- flowing.

In some embodiments of the present invention, the colored composition come into contact with the longitudinal element during movement of the cap by controlled displacement of either the colored composition, the longitudinal element or both.

In some embodiments of the present invention, free flow is not controlled displacement.

In some embodiments, the screw cap system may comprise at least one seal for separating the first and second composition and/or separating the at least one first section and the at least one second section, and/or for preventing drying of a liquid/gel composition.

Some embodiments may comprise any suitable seal-breaking element for breaking a seal arranged to separate the first composition from the second composition. Such seal breaking elements include spikes, tabs, arms, scrapes etc.

In some embodiments, the screw cap system may further include any advantageous ratchet rings, tabs and recesses for achieving a desired sequence of TTI system activation and/or opening/closure of the screw cap system.

BRIEF DESCRIPTION OF THE DRAWINGS

The present invention is described in detail by reference to the following drawings:

FIGS. 1a-1d are cross-sectional schematic drawings of some embodiments of a cap system according to the invention.

FIGS. 2a-2d are cross-sectional schematic drawings of some embodiments of a cap system according to the invention.

FIGS. 3a-3d are cross-sectional schematic drawings of some embodiments of a cap system according to the invention.

FIGS. 4a-4d are cross-sectional schematic drawings of some embodiments of a cap system according to the invention.

FIGS. 5a-5c are schematic drawings of some embodiments of a cap system according to the invention.

FIGS. 7a-7b are schematic drawings of some embodiments of a cap system according to the invention.

FIGS. 9a-9b are schematic drawings of some embodiments of a cap system according to the invention.

FIGS. 10a-10b illustrate some embodiments of a cap system according to the invention.

FIG. 11a-11b show details of different solutions suitable for some embodiments in FIGS. 10a-10b.

FIG. 12 show details of a cap system suitable for use with some embodiments in FIGS. 10a-10b.

FIG. 14 show various connection arrangements between cap elements of a cap system according to some embodiments of the invention.

FIG. 17a-17b are schematic drawings of some embodiments of a cap system according to the invention.

FIG. 18A illustrates a cap system comprising i) a cap for closure of an opening in a container; and ii) a time temperature indicator system. FIG. 18B illustrates a screw cap system comprising i) a screw cap for closure of a threaded opening in a container.

DETAILED DESCRIPTION OF THE INVENTION

Figure 1A:
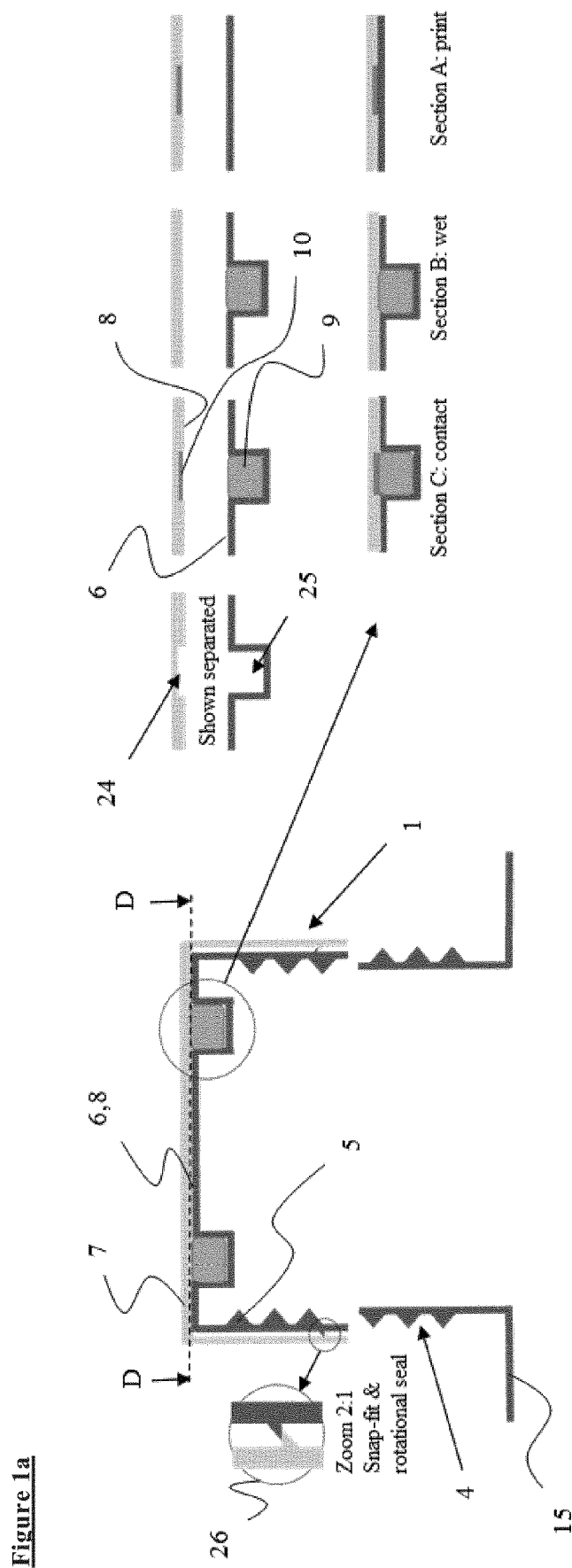

The cap systems according to some embodiments of the invention is described in detail by reference to the embodiments illustrated in FIGS. 1-18.

Some embodiments of the present invention comprise a time temperature dependent indicator system. In the below description, the time or time temperature indicator system is generally disclosed as comprising a first composition and a second composition. The first and the second composition provides a time temperature dependent visual change when they are in contact. The visual change is commonly a change in colour or the removal of a colour to reveal a graphical symbol and similar. In some embodiments, the first composition is a liquid or gel solvent and the second composition is a dry formulation that activates, i.e. provides a time temperature dependent visual change, when moisten by the liquid/gel solvent.

Time temperature indicator systems are commonly based on two different principles:

In the first principle, the first composition is a liquid composition allowed to migrate in a time temperature dependent manner through a longitudinal element.

In the simplest case, the first composition may be a colored composition, such as a colored liquid, and the indicator is based on the visual change provided by the front of the first composition as it migrates. Alternatively, the visual change is caused by first composition interacting with a second composition arranged in the longitudinal element, for instance the first composition has a certain pH-value and the second composition is a pH-indicator providing a visual change when the pH is changed by interaction with the first composition. See the disclosure of U.S. Pat. No. 9,235,194 B2 for compositions suitable for use in the first principle. A particularly advantageous indicator system is disclosed in the present application is disclosed in WO 2012/141594. The disclosed TTI system comprises a first and a second compartment (i.e. a first section and a second section) initially being separated for preventing contact between them. The system is activated by bringing said two compartments into contact and allow a liquid composition comprising a mutarotational reducing agent (i.e. a first composition) accommodated in the first compartment to migrate in a time temperature dependent manner through the second compartment. The second compartment contains an agent (i.e. a second composition) that changes visual appearance upon reduction. The mutarotational reducing agent will then reduce the agent that changes visual appearance upon reduction in a time temperature dependent manner. Thus, the time temperature sensitivity of the system is the result of a combination of two time-temperature dependent processes. The TTI systems according to the first principle, for instance as disclosed in WO 2012/141594, is in particular suitable for the below-described embodiments in FIGS. 5-8.

In the second principle, the first composition is a liquid/gel composition and the second composition is a dried composition, which is inactive until moistened/wetted by the first composition, or a liquid/gel composition, which is inactive until interaction with the first composition. In this principle, the first composition and/or the second composition is accommodated in multiple separate sections having different concentrations of active agent(s). The rate of visual change is dependent on the concentration(s) of active agent and the multiple separate sections provides a time temperature dependent visual change. Alternatively, the first composition in the multiple separate sections has an equal concentration of active agent(s), but are separated from the second composition by a barrier film through which one of the compositions may diffuse over a time period depending on the thickness of the barrier film. The thickness of the barrier film is different for each separate section, such that a time temperature dependent indicator is obtained.

A particularly advantageous indicator system is disclosed in patent application WO2017/103206. In WO2017/103206, one of the first or second composition is a dried composition and the other is a liquid/gel composition. The dried composition may be obtained by for instance printing a liquid, in which the composition is dissolved, onto a substrate (i.e. for instance printed onto a first or second section) and dried. The dried composition is not active, i.e. does not provide a time temperature dependent visual change. The concentration of an active agent in the dried composition may be varied. In the present invention, the time temperature indicator may for instance comprise multiple first sections and multiple second sections, wherein each first section comprises a dried composition with a different concentration of an active agent (i.e. a compound(s) contributing to a time temperature dependent visual change when moistened/wetted by a solvent/gel composition) and each second section comprises a liquid/gel composition for wetting of the dried composition. The TTI systems according to the second principle, for instance as disclosed in WO2017/103206, are in particular suitable for the below-described embodiments in FIGS. 1-4 and 9-11.

It is noted that based on the present disclosure the skilled person would know of numerous time temperature indicator systems, and corresponding reactants/compositions, suitable for use in the present cap system.

Some embodiments of a cap system according to the invention are shown in FIGS. 1a-1d. The cap system comprises a screw cap 1 for closure of the threaded opening 4. The threaded opening features a collar 15, which may be connected to a container 17 (see for instance FIG. 11a) for instance by gluing. The screw cap system features a time temperature indicator (TTI) system comprising multiple first sections 2,2' and multiple second section 3,3'. In FIGS.

1a-1d only two first sections and two second sections are shown for illustrative purposes. However, the screw cap system will commonly feature more than two of each section to provide a better indicator resolution. The first and second sections are arranged such that the first section 2 and the cooperating second section 3 is separated when the time temperature indicator system is inactive, see FIG. 1b, and in close contact when activated, see FIG. 1d, by twisting the screw cap. Each of the first sections features a first composition 9, and each of the second sections comprises a second composition 10. In some embodiments the first composition is a wet gel and the second composition is dry. The second composition 10 in one of the two second sections 3 comprises an active agent in a concentration different from the concentration present in the second composition in the other second section 3'. When the first sections and the second sections are brought into contact, the rate of the time temperature dependent visual change will be different in the two second sections, and a time temperature dependent indicator is obtained. As discussed, the second composition is a dry composition. Such compositions may be obtained by for instance printing a liquid in which the second composition is dissolved. This may be done, for instance as disclosed in WO2017/103206.

The outer cap element 7, or at least a top section of the outer cap element, is in a transparent material such that the time and temperature dependent visual change of the second composition is detectable on an external surface of the screw cap system. An inner surface 8 (i.e. second surface) of the outer cap element lies entirely flat with a top surface of the inner cap element 5 providing a surface to surface contact. The inner surface of the outer cap element comprises pockets/recesses 24 for the second composition 10. The top surface 6 (i.e. first surface) of the inner cap element 5 comprises pockets/recesses 25 for the first composition 9. The inner cap element and the outer cap element is connected by a one-way snap-fit connection 26, comprising cooperating snap flanges on the inner and the outer cap element, providing a rotational seal between the two cap elements. The snap-fit connection locks the outer cap element to the inner cap element and maintains a seal surface pressure between the inner surface 8 and the top surface 6.

Preferably, the interaction of the two facing surfaces is sufficient by itself to prevent any migration of compositions between the first and the second sections. However, suitable sealing means, e.g. lip seal(s) around the first or second sections, wipe seal or similar, may be arranged to ensure total separation between the first and second sections (or first and second compositions) in the non-activated state. The sealing between the two surfaces may also be enhanced by selection of hard vs soft materials, for instance having the outer cap element made in a harder material than the inner cap element.

When arranged on a container, the screw cap 1 of the screw cap system is initially fully screwed onto the threaded opening 4 before the container is opened for the first time, i.e. the TTI system is in a non-activated position (or first position). In the non-activated position, the first sections 2,2' are not aligned with the corresponding second sections 3,3'. During opening, the outer cap element is initially rotated relative to the inner cap element. The outer cap element is commonly connected to the threaded opening 4 or collar 15 via a breakable tab/pin, burst ring or similar (not shown) for preventing the outer cap element from rotating prematurely, i.e. When the outer cap element has been rotated such that the first sections 2,2' are aligned with the corresponding second sections 3,3' (i.e. reached a second position), the outer cap element is locked into place, for instance by a suitably arranged tab(s)/recess(es), preventing further relative movement between the outer and the inner cap element. The first and second compositions 9,10 are now in contact and the TTI system is activated. Continued rotation of the outer cap element will move the inner and outer cap element relative to the threaded opening 4 and the screw cap is screwed off the threaded opening. In a subsequent reattachment of the screw cap onto the threaded opening the inner cap element and the outer cap element are stationary relative to each other and the TTI system kept in the activated position.

The size of the first and second sections 2,3 may be varied. For instance, the size may be shortened, thus shorten the degrees of rotation needed to activate the TTI system.

The rotation of the cap (in this embodiment the rotation of the outer cap element) can activate multiple individual pairs of first and second sections.

The rotation of the screw cap/a color change/hiding or revealing a symbol can be used as an anti-tamper warning device Some embodiments of a cap system according to the invention are shown in FIGS. 2a-2d. The main differentiating features compared to that of FIGS. 1a-1d, is the design of the inner and outer cap elements. In some embodiments, the inner cap element 5 is a circular plate element, wherein the inner cap element features the threads for interaction with the threaded opening. However, to provide a relative motion between the top surface 6 of the inner cap element 5 and the inner surface 8 of the outer cap element 7, the inner cap element comprises at least one tab for interaction with a cooperating recess/slot in the top edge 27 of the threaded opening 4, or vice versa. The tab/recess assembly is not shown. During initial opening of the screw cap 1, the tab on the inner cap element 5 ensures that the inner cap element is stationary relative the threaded opening while the outer cap element rotates until the TTI system is in an activated position, i.e. the first and second sections 2,2',3,3' are aligned. The tab/recess is dimensioned/designed such that the tab is lifted out of the cooperating recess due to the angle of the threads when the activated position is reached.

Some embodiments of a cap system according to the invention are shown in FIGS. 3a-3d. The screw cap system comprises a collar and threaded opening. In some embodiments, the multiple first sections 2 and multiple corresponding second sections 3 are moved relative to each other, and the TTI system activated, by pushing the outer cap element 7 against the inner cap element 5 (i.e. not by rotation) in a linear movement. After activation, the inner and outer cap element is locked together. The outer cap must be pushed to activate the TTI system and allow rotation of the entire screw cap relative a threaded opening. The outer cap element comprises recesses arranged at the lower edge for interaction with tabs/stopper 13 arranged on the inner cap element. The tabs prevent rotation of the screw cap before activation and ensures correct positioning of the first and second sections during activation.

Some embodiments of a cap system according to the invention shown in FIGS. 4a-4d. In some embodiments, the multiple first sections 2,2' and the multiple second sections 3,3' are arranged at the collar 15 around the threaded opening 4. The first sections 2,2' are arranged in compartments in a first circular channel 28 having a first surface 6', and the second sections 3,3' are arranged in a cooperating transparent second circular channel (or profiled ring) 29. The compartments are delimited by lip seals 16. The first and second channel are slidably connected, forming a closed circular space. The screw cap 1 is releasably connected to the second channel 29, such that the second sections move relative to the first sections until they are in contact with each other and the TTI system is activated. After activation the connection between the screw cap and the second channel are released.

Some embodiments of a cap system according to the invention are shown in FIGS. 5a-5d. In some embodiments, the first section 2 comprising a liquid first composition 9 is arranged in an outer cap element 7, and the second section 3 comprising a second composition 10 distributed in a longitudinal element 12 is arranged in an inner cap element 5. The longitudinal element comprises a material through which the first composition 9 may migrate in a time temperature dependent manner, e.g. a type of wick or porous material. During rotation of the outer cap element, the first section is aligned and brought into contact with one end of the second section 3, such that the TTI system is activated. In some embodiments, the first composition may for instance comprise a reducing agent and the second composition may comprise a compound that changes color when reduced by said reducing agent in the first composition. Specific examples of suitable compositions are disclosed in for instance WO 2012/141594. Depending on the connection between the inner and outer cap element, the TTI system may be activated upon opening the container 17 for the first time, FIG. 5c, or upon closing of the container for the first time after opening, FIG. 5b.

Figure 6B:
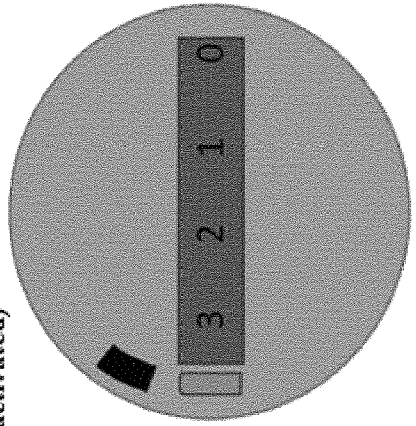
FIGS. 6a-6c are schematic drawings of some embodiments of a cap system according to the invention.
Figure 6A:
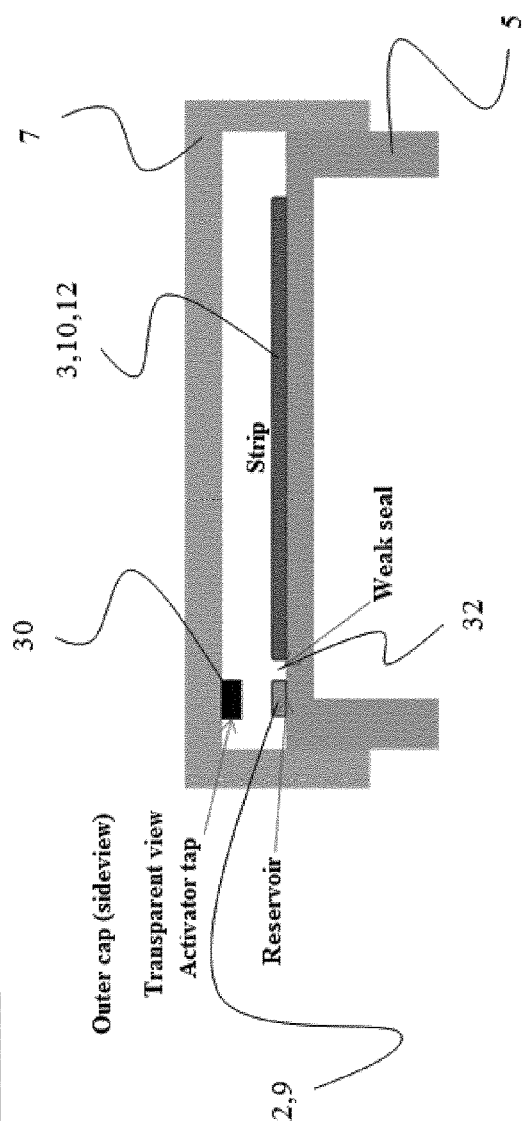
Figure 6C:
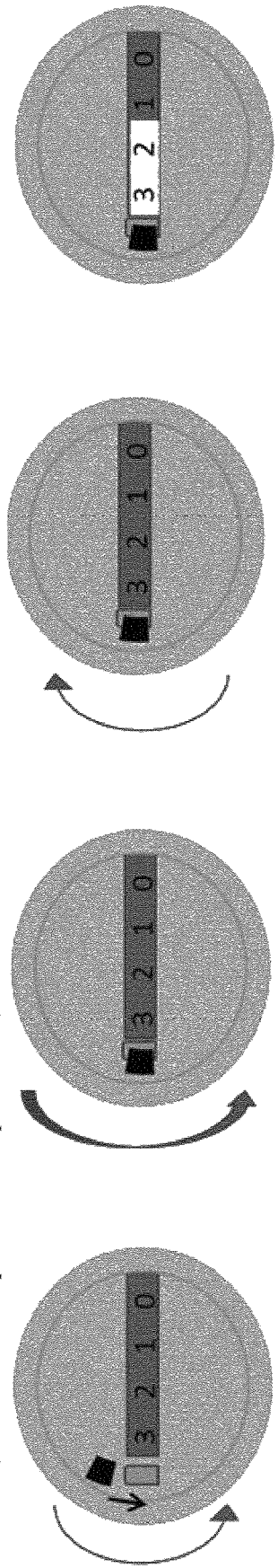
Figure 8A:
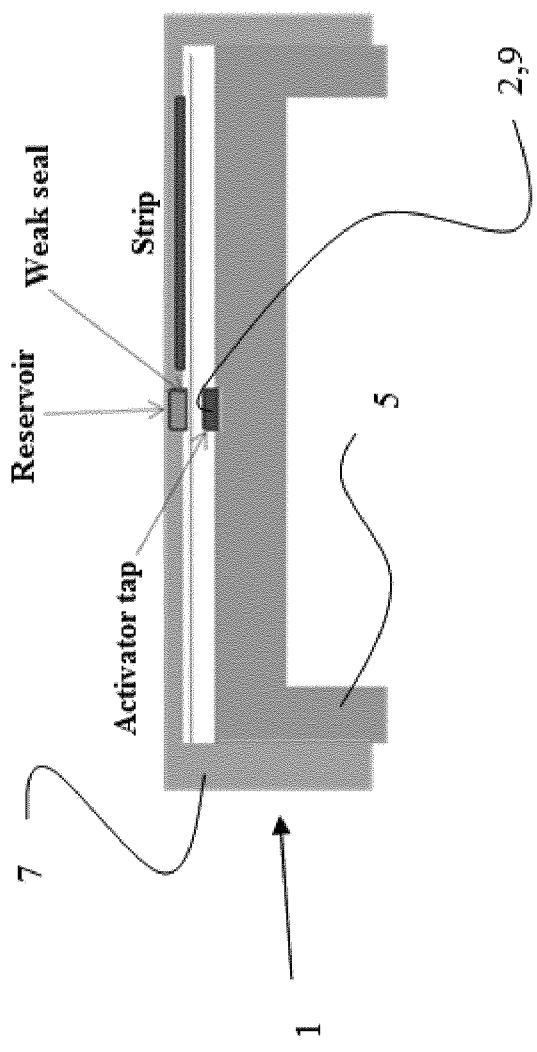
FIGS. 8a-8c are schematic drawings of some embodiments of a cap system according to the invention.
Figure 8C:
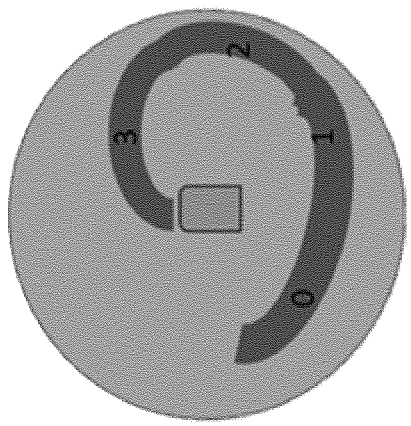
Figure 8B:
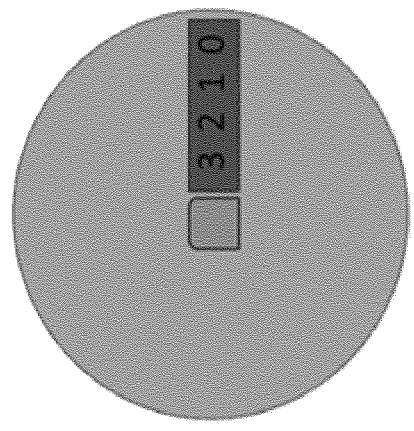

In FIGS. 6-8, the activation is not obtained by moving the first and the second section relative to each other. The first section comprising a liquid first composition is arranged close to one end of a longitudinal element 12 in the second section. The first composition is for instance separated from the second composition (or second section or longitudinal element) by a weak seal 32. Both the first section and the second section is arranged at the top surface of the inner cap element, FIGS. 6,7 or at an inner surface of the outer cap element, FIG. 8. In some embodiments, an inner surface of the outer cap element, FIGS. 6,7 or a top surface of the inner cap element, FIG. 8, comprises an activator element, i.e. an activator tap 30 or spring element 31. The TTI system is activated by moving the outer cap element relative to the inner cap element, such that the spring element interacts with the first section and breaks the weak seal 32. The activation is obtained by rotation of the outer cap element, FIGS. 6,7 or by pushing the outer cap element towards the inner cap element, FIG. 8.

FIGS. 9a-9b are similar to FIG. 3, having a different design of the time and temperature dependent visual change.

Figure 10A:
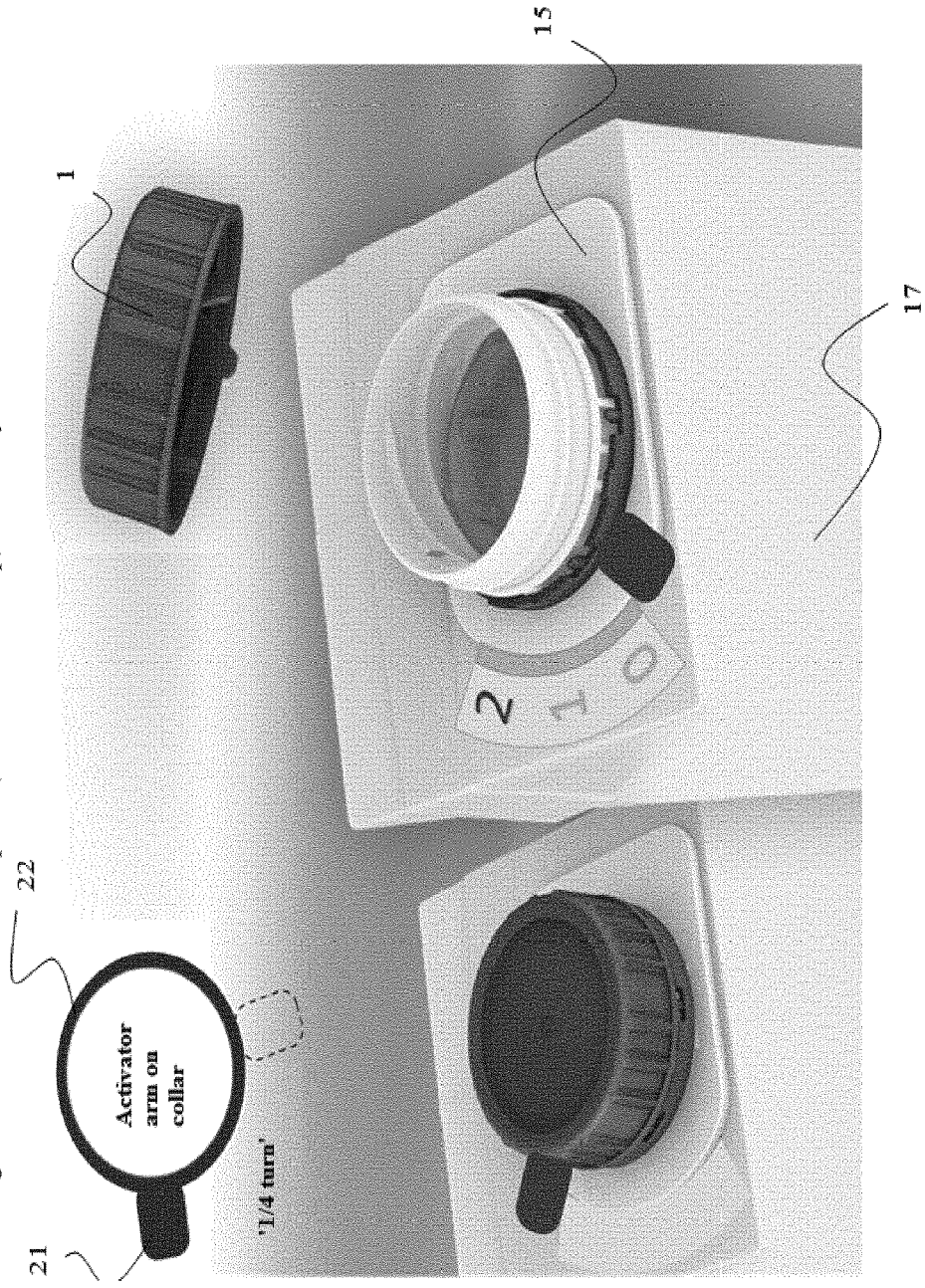

Some embodiments of a cap system according to the invention are shown in FIGS. 10a-10b. In some embodiments, the TTI system comprises an arm/tab 21 arranged to break a sealing 23 between the first section 2 and the second section 3 when the screw cap is twisted. The tab 21 is arranged on a releasable ring 22 connected to a lower edge of the screw cap 1. The ring is released from the lower edge when the screw cap and the releasable ring are twisted beyond a desired range and the TTI system is activated. The first section 2 and the second section 3 is arranged on the collar 15 comprising the threaded opening, or on the surface of the container 17 on which the screw cap system is arranged. The first section and the second section are arranged such that the sealing is broken when the arm/tab 21 is moved over at least parts of the first or second section when the screw cap is twisted.

Figure 11A:
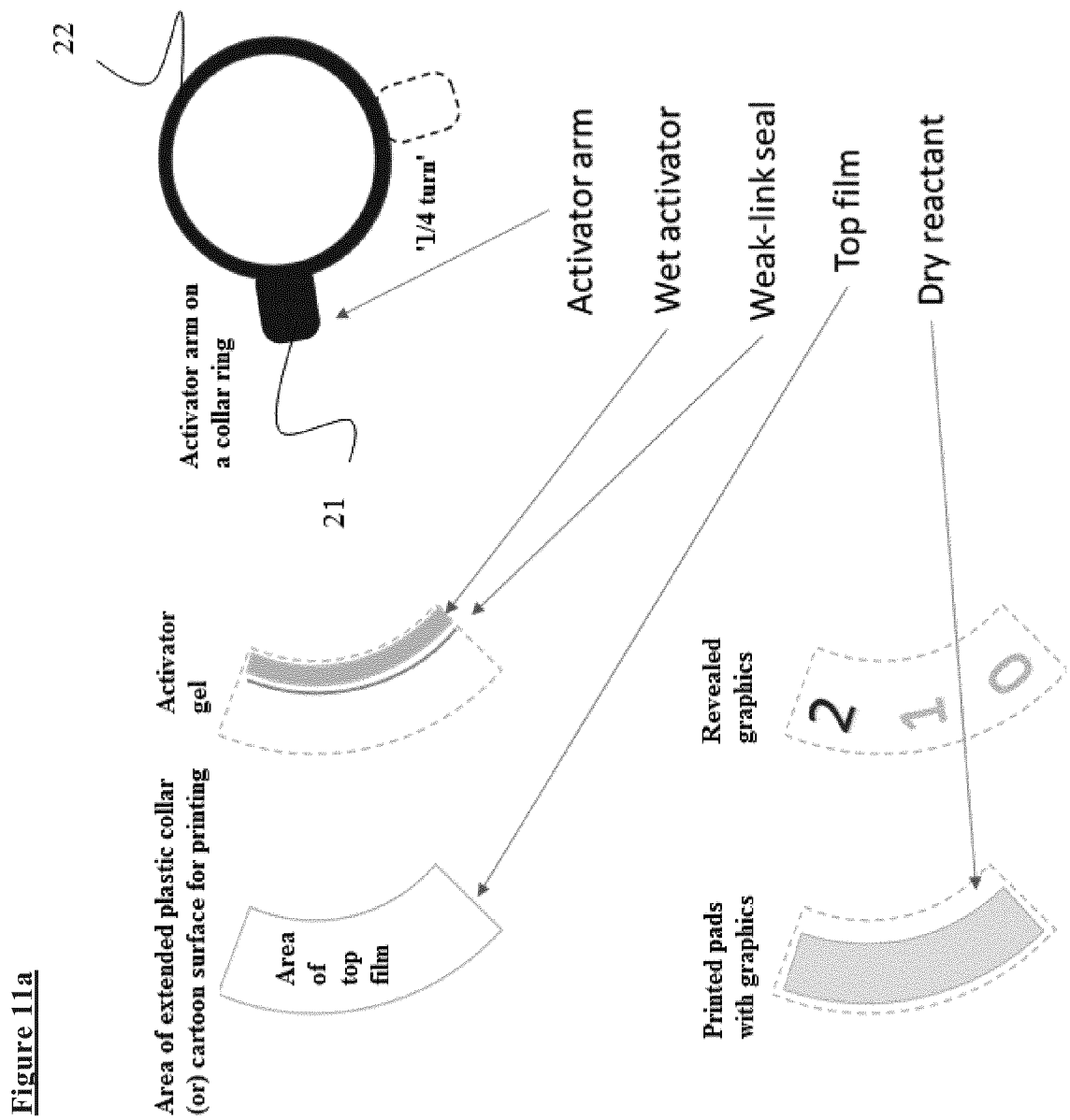

Alternative solutions for use with the system in FIGS. 10a-10b are shown in FIG. 11a-b.

The function of the releasable ring 22 and the cap 1 is illustrated in FIG. 12.

Figure 13:
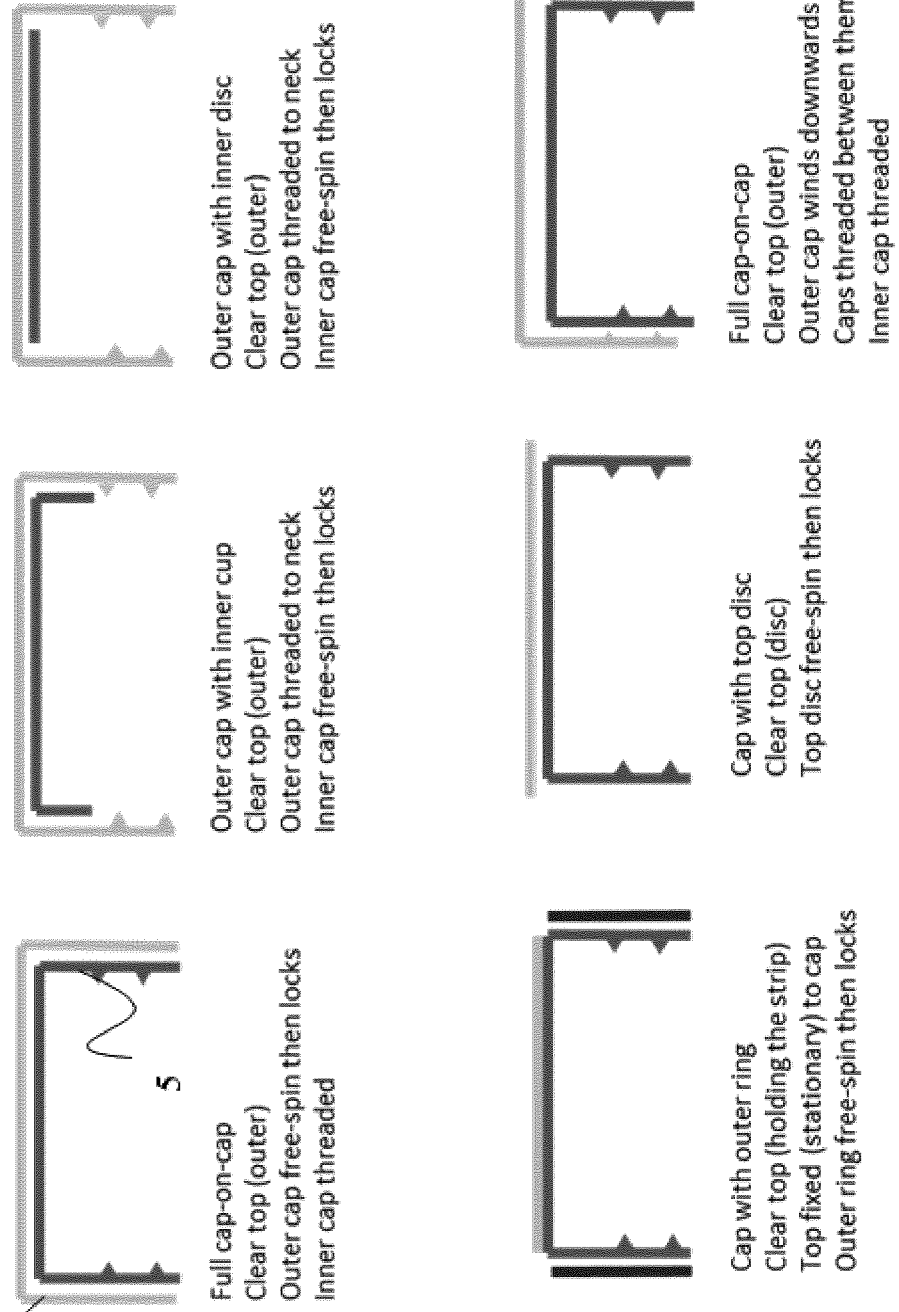
FIG. 13 show various cap arrangements suitable for the present invention.

Various functional combinations of a cap 1 featuring an inner cap element 5 and an outer cap element 7 are illustrated in FIG. 13.

Various snap-fit connections between an inner cap element 5 and an outer cap element 7 are illustrated in FIG. 14.

Figure 15:
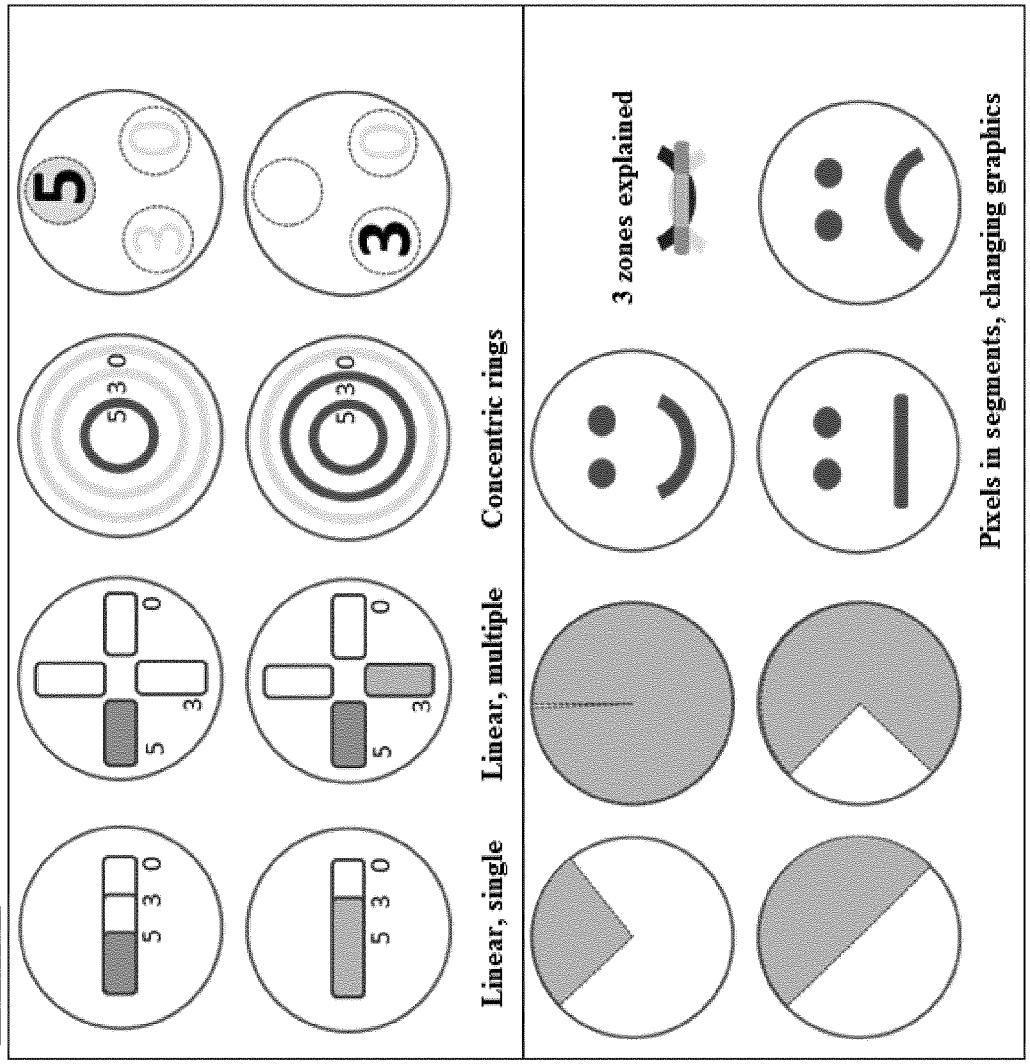
FIG. 15 show various graphic designs of the visual change obtained by a time temperature indicator on a cap system according to some embodiments of the invention.
Figure 16:
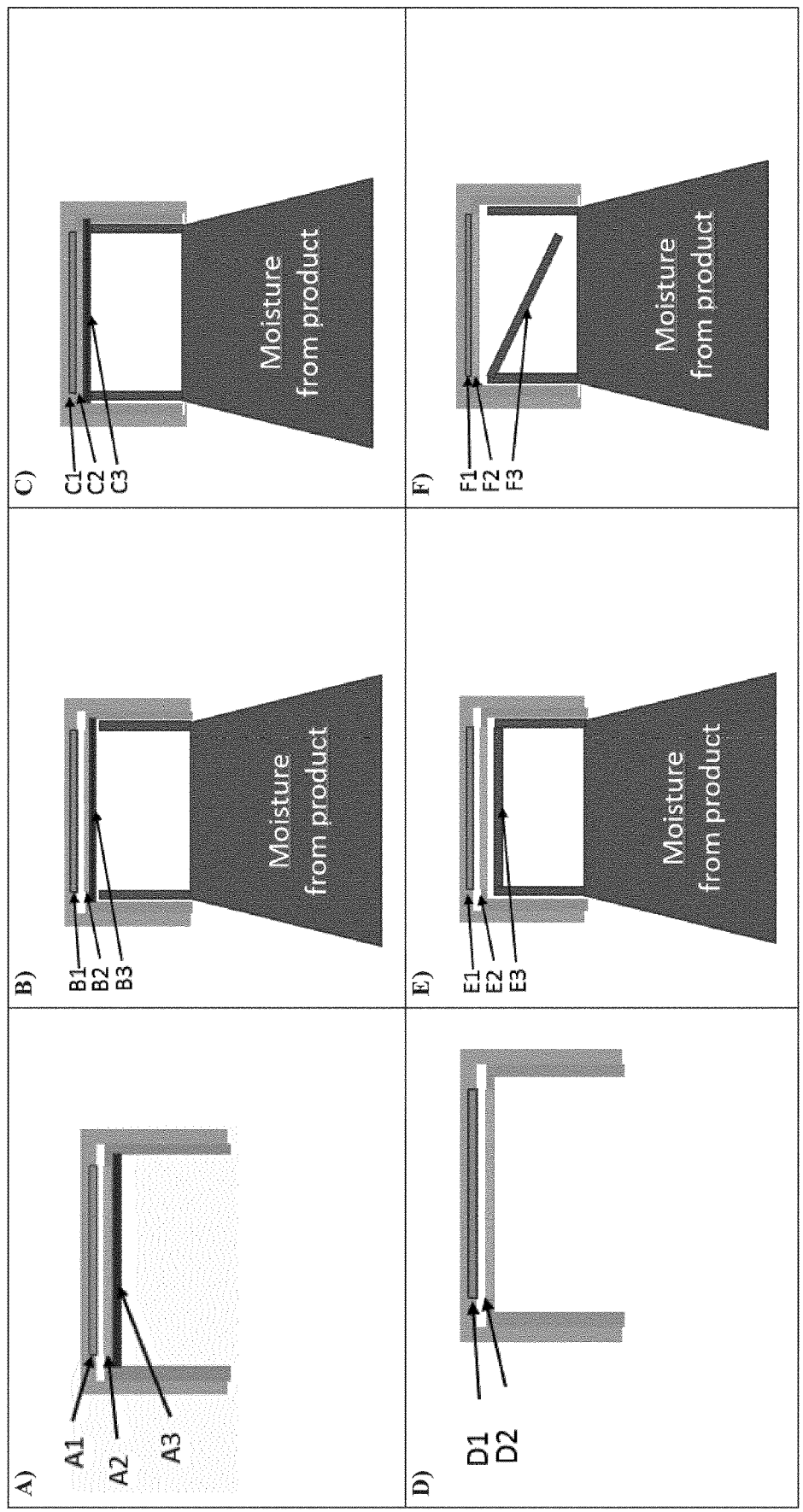
FIG. 16a-16c are schematic drawings of some embodiments of a cap system according to the invention.
FIG. 16d-16f are schematic drawings of some embodiments of a cap system according to the invention.

Various alternative designs of the time temperature dependent visual change obtained by a TTI system in a cap system according to the invention is illustrated in FIG. 15.

When used on bottles etc. wherein the threaded opening is an integral part of the container, the screw cap system does not comprise the threaded opening.

Some embodiments of a cap system according to the invention is shown in FIGS. 16a-16c. The cap system comprises a water-permeable membrane (A3, B3, C3) separating the first composition (A1, B1, C1) and the second composition (A2, B2, C2) of the time temperature indicator system from the environment within the container housing the product to be monitored. Moisture in the environment surrounding the product to be monitored will pass the water-permeable membrane and thereby moisten the composition closest to the water-permeable membrane (B2, C2). The time temperature indicator system is activated by bringing the first composition (C1) into contact with the second composition (C2). FIG. 16A illustrating a cap suitable for long-term storage in inactive state. FIG. 16B illustrating the cap combined with a product container but still in an inactive state. FIG. 16C illustrating the cap combined with a product container in an active state. A1 and B1 representing the first composition in dry condition. C1 representing the first composition in moistened condition. A2 representing the second composition in dry condition. B2 and C2 representing the second composition in moistened condition. A3, B3 and C3 representing the water-permeable membrane.

Some embodiments of a cap system according to the invention are shown in FIGS. 16d-16e. The cap system comprises a water-impermeable sealing (E3, F3) separating the first composition (E1, F1) and the second composition (E2, F2) of the time temperature indicator system from the environment within the container housing the product to be monitored. Moisture in the environment surrounding the product to be monitored will not pass the water-impermeable membrane; and the composition closest to the water-impermeable membrane (E2, F2) will therefore remain dry until the sealing (E3, F3) is broken. The time temperature indicator system is activated by bringing the first composition (F1) into contact with the second composition (F2) and breaking the water-impermeable sealing (F3). FIG. 16D illustrating a cap suitable for long-term storage in inactive state. FIG. 16E illustrating the cap combined with a product container but still in an inactive state. FIG. 16F illustrating the cap combined with a product container in an active state. D1 and E1 representing the first composition in dry condition. F1 representing the first composition in moistened condition. D2 and E2 representing the second composition in dry condition. F2 representing the second composition in moistened condition. E3 and F3 representing the water-impermeable sealing.

Some embodiments of a cap system according to the invention is shown in FIGS. 17a-17b. In some embodiments, the time temperature indicator is attached to a "press and release bottle", e.g. a typical nasal spray bottle. The cap is neither threaded nor is intended to be screwed upon opening. One section of the time temperature indicator is attached to the movable part of the bottle while the other section is attached to the non-movable part of the bottle, said moveable part being pushed to release a dose of the composition within the bottle. When the moveable part is being pushed, the first section of the time temperature indicator is brought into contact with the second section of the time temperature indicator thereby activating the indicator. FIG. 17a is a front view illustration of the nasal spray bottle and FIG. 17b being a side view illustration of the nasal spray bottle. It is to be understood that an indicator that has been activated by bringing the first and second section into contact will remain in active state even if the two sections are separated after activation.

The above mentioned embodiment refers to a cap that is neither threaded nor is intended to be screwed upon opening. Non-limiting examples of such caps being caps on top of a vaccine, nasal spray or a closed lid on a container such as painting bucket. Alternatively, the closure may be a closure combined with plastic bags or containers such as a closure for a bag-in-box wine or a blood bag.

The closure may be squeezable or push activated. The closure may comprise first and/or second section or the first and/or second section may be attached to or being an integral part of the product container. During the activation the cap is typically moved such that the first and second section are moved relative to each other.

In addition to the features described in connection with the above embodiments, the cap system according to some embodiments of the invention may also comprise any required ratchet rings, tabs/recess assemblies etc. to obtain a desired sequence of movement between an inner cap element, an outer cap element and/or a collar, releasably locking the screw cap to a threaded opening or any other advantageous function.

All publications, patent applications, patents, and other references mentioned herein are incorporated by reference in their entirety. In case of conflict, the present specification, including definitions, will prevail.

The TTI may also have a threshold temperature, i.e. the progress of the TTI indicator is slowed down or stopped when below the given threshold temperature. This may be obtained by for instance having a liquid first composition distributed in a wax matrix, wherein the wax matrix has a melting temperature equal to a desired threshold temperature.

The invention claimed is:

1. A cap system comprising:
   a cap for closure of an opening in a container; and
   a time temperature indicator (TTI) system,
   wherein the TTI system comprises a first section comprising a first composition and a second section comprising a second composition, wherein the first composition and the second composition are initially separated in a non-activated position such that the first section is not aligned with the second section, the first section is arranged at a first surface and the second section is arranged at a second surface and the first and the second surfaces are arranged to move relative to each other, and the TTI system is activated by moving the cap such that the first section is rotated relative to the second section thereby aligning the first section and the second section and providing a surface to surface contact causing the first composition and the second composition to come into contact with each other,
   wherein the first composition and the second composition provide a time-dependent and a temperature-dependent change in appearance when brought into contact with each other, and
   wherein at least one of the first composition and the second composition is non-flowing.

2. The cap system of claim 1, wherein the cap is a screw cap and the opening is a threaded opening.

3. The cap system of claim 1,
   wherein the first section or the second section is configured to move between a first position and a second position, wherein in the first position, the first composition and the second composition are separate, and in the second position, the first composition and the second composition are in contact,
   wherein the first section is arranged at a first surface and the second section is arranged at a second surface, the first surface facing the second surface, and
   wherein the first surface and the second surface are configured to rotate relative to each other between the first position and the second position when the cap is twisted.

4. The cap system of claim 1, wherein the cap comprises an inner cap element comprising a first surface and an outer cap element comprising a second surface, and the inner cap element is configured to move relative to the outer cap element thereby activating the TTI system.

5. The cap system of claim 1, wherein the first section or the second section is configured to move between a first position and a second position, wherein in the first position, the first composition and the second composition are separate, and in the second position, the first composition and the second compositions are in contact,
   wherein the first section is arranged at a first surface and the second section is arranged at a second surface, the first surface facing the second surface;
   wherein the cap comprises an inner cap element and an outer cap element, and the inner cap element is configured to move relative to the outer cap element when the TTI system is activated by moving the cap; and
   wherein the first surface and the second surface are configured to move relative to each other between the first position and the second position when the outer cap element is pushed towards the inner cap element.

6. The cap system of claim 1, wherein the first section or the second section is configured to move between a first position and a second position, wherein in the first position, the first composition and the second composition are separate, and in the second position, the first composition and the second composition are in contact,
   wherein the first section is arranged at a first surface and the second section is arranged at a second surface, the first surface facing the second surface,
   wherein the cap comprises an inner cap element and an outer cap element, and the inner cap element is configured to move relative to the outer cap element when the TTI system is activated by moving the cap, and
   wherein the first surface and the second surface are configured to move relative to each other between the first position and the second position when the inner cap element is pulled towards the outer cap element.

7. The cap system of claim 1, wherein the cap is a screw cap and the opening is a threaded opening, wherein the threaded opening comprises a collar arrangeable on the container, and the collar comprises the first surface, or the first surface is on a container on which the collar may be arranged, and the second surface is arranged on a ring element releasably connected to the cap, such that the second surface is rotated relative the first surface and the ring element released from the cap when the cap is twisted during opening.

8. The cap system of claim 1, wherein at least one of the first section and the second section comprises a transparent material such that the change in appearance is visible on an external surface of the cap system.

9. The cap system of claim 1, wherein the first section is arranged at a first surface and the second section is arranged at a second surface, the first surface facing the second surface, and
   wherein the first section comprises a recess in the first surface and the second section comprises a recess in the second surface.

10. The cap system of claim 1, wherein the first composition is a liquid or gel and the second composition is dry.

11. The cap system of claim 1, wherein the first section comprising the first composition is a liquid arranged in the outer cap element and the second section comprising the second composition is distributed in a longitudinal element arranged in the inner cap element, the longitudinal element comprising a material through which the liquid composition may migrate in a time-dependent manner, and wherein the first composition is configured to come into contact with an end of the longitudinal element when the TTI system is activated by moving the cap.

12. The cap system of claim 1, wherein the cap system is for continuously monitoring time-temperature exposure of a product after the container housing the product has been opened for the first time.

\* \* \* \* \*